United States Patent
Jalil (12)

(10) Patent No.: US 10,708,204 B1
(45) Date of Patent: Jul. 7, 2020

(54) METHOD AND SYSTEM FOR FACILITATING USER COLLABORATION

(71) Applicant: Tariq Jalil, Venice, CA (US)

(72) Inventor: Tariq Jalil, Venice, CA (US)

( * ) Notice: Subject to any disclaimer, the term of this patent is extended or adjusted under 35 U.S.C. 154(b) by 0 days.

(21) Appl. No.: 15/984,976

(22) Filed: May 21, 2018

Related U.S. Application Data

(63) Continuation of application No. 15/444,821, filed on Feb. 28, 2017.

(51) Int. Cl.
  *H04L 12/58* (2006.01)
  *H04L 29/08* (2006.01)
  *G06Q 10/10* (2012.01)

(52) U.S. Cl.
  CPC ......... *H04L 51/046* (2013.01); *G06Q 10/101* (2013.01); *H04L 51/10* (2013.01); *H04L 67/02* (2013.01)

(58) Field of Classification Search
  CPC .................................................. G06Q 10/101
  See application file for complete search history.

(56) References Cited

U.S. PATENT DOCUMENTS

| | | | | |
|---|---|---|---|---|
| 8,589,806 B1* | 11/2013 | Sena | .................. | H04M 7/0027 715/753 |
| 2002/0132656 A1* | 9/2002 | Lydon | .................. | G06Q 10/06 463/9 |
| 2012/0317108 A1* | 12/2012 | Okazaki | ................ | G06F 3/0488 707/732 |
| 2014/0117073 A1* | 5/2014 | Bell | ..................... | H04L 12/1818 235/375 |
| 2014/0178035 A1* | 6/2014 | Ballagas | .............. | G11B 27/031 386/230 |
| 2015/0026062 A1* | 1/2015 | Paulsen | .................. | G06Q 20/29 705/44 |
| 2015/0085707 A1* | 3/2015 | Shi | ...................... | H04L 12/1831 370/261 |
| 2016/0225037 A1* | 8/2016 | Ezumba | ............. | G06Q 30/0279 |
| 2018/0025322 A1* | 1/2018 | Kurghinyan | ....... | G06Q 10/1053 |
| 2018/0061133 A1* | 3/2018 | Wu | ......................... | H04W 4/70 |
| 2018/0077092 A1* | 3/2018 | Jalil | ..................... | G06Q 10/101 |

* cited by examiner

*Primary Examiner* — David E Choi

(74) *Attorney, Agent, or Firm* — Eandi Fitzpatrick LLP; William Fitzpatrick

(57) ABSTRACT

Method and system for facilitating user collaboration are disclosed. The method includes provisioning access to a collaboration application for a plurality of users. A post related to a problem to be solved or a project to be completed is received from a user using the collaboration application. The post is displayed on at least one UI of the collaboration application for enabling viewing of the post by remaining users of the collaboration application. A creation of a user group is facilitated subsequent to receiving replies from one or more users indicating interest in collaborating with the user in response to the displayed post. One or more relevant tools and interaction options are provisioned to the user group to facilitate user collaboration. Further, a moderation of the user group is facilitated to enable completion of the project or selection of a solution to the problem being solved.

37 Claims, 12 Drawing Sheets

METHOD AND SYSTEM FOR FACILITATING USER COLLABORATION

BACKGROUND

1. Field of the Invention

The present application generally relates to computer-based tools enabling individuals to collaborate and work as teams on solving problems or completing projects across a wide range of disciplines.

2. Description of Related Art

Individuals may collaborate with each other for various reasons. For example, a team of doctors may collaborate to combat spread of an epidemic, or, a group of designers may collaborate to devise the most energy-efficient design for a building structure. Traditionally, such collaboration required the participants to be physically present at a common location and conduct a face-to-face discussion. However, nowadays, several tools are available, which enable the participants to engage with each other without being present at a common location and collaborate even from remote locations. Some examples of such tools include voice or video conferencing platforms, email or instant messaging applications, and the like. However, the reach of such tools is limited to known network of individuals. For example, individuals typically invite known contacts for collaboration using these tools. In some scenarios, the individuals may want to collaborate with other individuals not known to them and who are working on solving a similar problem or have relevant area of expertise.

Many online collaborative platforms are now available, which enable users to post queries to a community of users or seek answers to their problems from general public. However, collaboration afforded by such online forums or communities is limited in its ability to assist the user. More specifically, such collaborative platforms, though fulfilling the short-term objective of receiving answers to user queries, fail to enable the users to work as teams with other individuals and solve the problem or complete projects together.

More recently, many crowdsourcing platforms are now being deployed to facilitate user collaboration with other individuals. With a large crowd of people sharing ideas and skills, the quality of work is generally superior. However, crowdsourcing platforms only focus on getting people with similar interests in solving problems and/or completing projects, together. More specifically, such collaboration tools are limited in their ability to facilitate active collaboration among participants once a team of individuals is formed. Typically, such tools enable the users to collaborate only using text-based messages. For example, these tools do not enable the participants to interact in real-time, share documents and multimedia content, work on a common workspace etc. The users typically have to use additional tools to implement such functions. It may not always be feasible to purchase several new tools for users, or, to achieve tool compatibility across teams involving a large number of members across geographies.

DESCRIPTION OF THE DRAWINGS

Furthermore, the conventional collaboration tools do not provide participants with discipline-specific tools for use during collaboration. For example, a team of software engineers may require a testing environment to test their code. In another illustrative example, a team of architects may require Computer Aided Design (CAD) tools to collaborate with each other. The conventional collaboration mechanisms do not provide such multi-disciplinary tools and are limited in their ability to facilitate active collaboration.

As such, conventional collaboration mechanisms suffer from several limitations and there is a need to overcome the aforementioned drawbacks and provide additional advantages to facilitate user collaboration.

SUMMARY

Figure 1A:
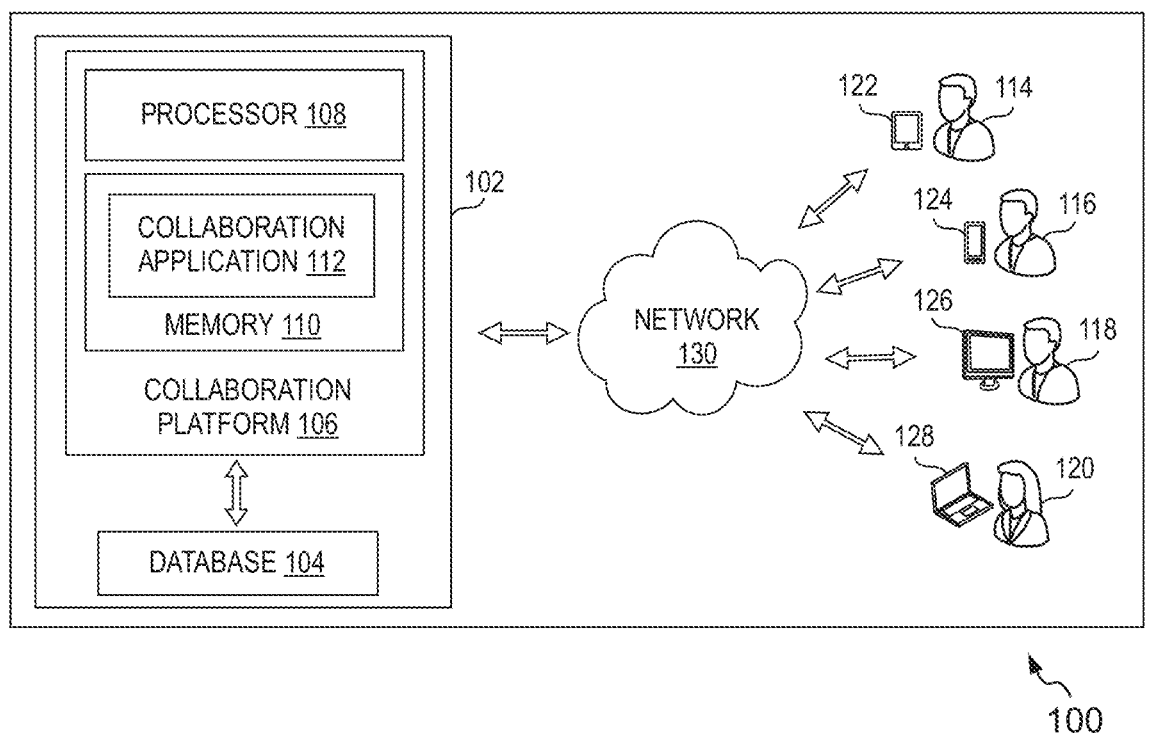

Various embodiments of the present disclosure provide methods, systems and computer program products for facilitating user collaboration.

In an embodiment, a method for facilitating user collaboration is disclosed. The method provisions, by a processor, access to a collaboration application for a plurality of users. The collaboration application includes a plurality of user interfaces (UIs) configured to facilitate collaboration among users. The method receives, by the processor, a post related to a problem to be solved or a project to be completed from a user from among the plurality of users. The post is provisioned by the user using the collaboration application. The method effects, by the processor, display of the post on at least one UI of the collaboration application for facilitating viewing of the post by remaining users from among the plurality of users. The method facilitates, by the processor, creation of a user group for collaborating on the problem to be solved or the project to be completed subsequent to receiving replies from one or more users indicating interest in collaborating with the user in response to the displayed post. The method provisions, by the processor, one or more relevant tools and interaction options to the user group to facilitate user collaboration. The method facilitates, by the processor, moderation of the user group to enable completion of the project or selection of a solution to the problem being solved.

In an embodiment, a system configured to facilitate user collaboration is disclosed. The system includes a database, and a collaboration platform communicably coupled with the database. The collaboration platform includes at least one processor and a memory having stored therein machine executable instructions, that when executed by the at least one processor, cause the system to provision access to a collaboration application for a plurality of users. The collaboration application includes a plurality of user interfaces (UIs) configured to facilitate collaboration among users. The system receives a post related to a problem to be solved or a project to be completed from a user from among the plurality of users. The post is provisioned by the user using the collaboration application. The system effects display of the post on at least one UI of the collaboration application for facilitating viewing of the post by remaining users from among the plurality of users. The system facilitates creation of a user group for collaborating on the problem to be solved or the project to be completed subsequent to receiving replies from one or more users indicating interest in collaborating with the user in response to the displayed post. The system provisions one or more relevant tools and interaction options to the user group to facilitate user collaboration. The system facilitates moderation of the user group to enable completion of the project or selection of a solution to the problem being solved.

In an embodiment, a computer program product configured to facilitate user collaboration is disclosed. The computer program product includes at least one computer-readable storage medium. The computer-readable storage medium includes a set of instructions, which, when executed by one or more processors, cause an electronic device to at least effect display of at least one user interface (UI) from among a plurality of user interfaces (UIs) configuring a collaboration application. The collaboration application is configured to facilitate collaboration among users. The electronic device receives input corresponding to a post related to a problem to be solved or a project to be completed from a user associated with the electronic device. The post is provisioned by the user using the collaboration application. The post is displayed on one or more UIs of the collaboration application for facilitating viewing of the post by remaining users from among a plurality of users of the collaboration application. The electronic device facilitates creation of a user group for collaborating on the problem to be solved or the project to be completed subsequent to receiving replies from one or more users indicating interest in collaborating with the user in response to the displayed post. The collaboration application is configured to provision one or more relevant tools and interaction options to the user group to facilitate user collaboration, and facilitate moderation of the user group to enable completion of the project or selection of a solution to the problem being solved.

Other aspects and example embodiments are provided in the drawings and the detailed description that follows.

BRIEF DESCRIPTION OF THE FIGURES

Figure 1B:
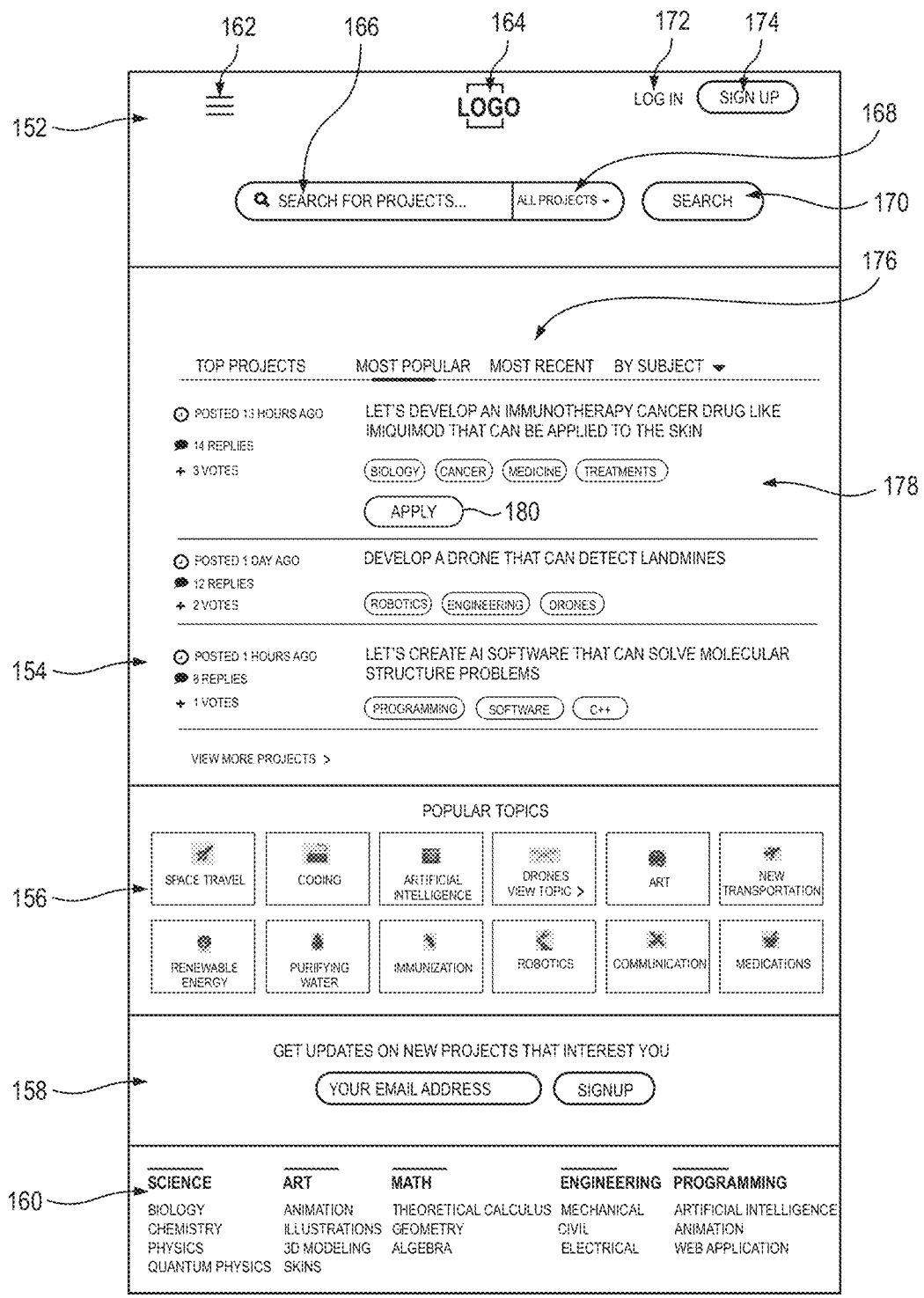
Figure 2:
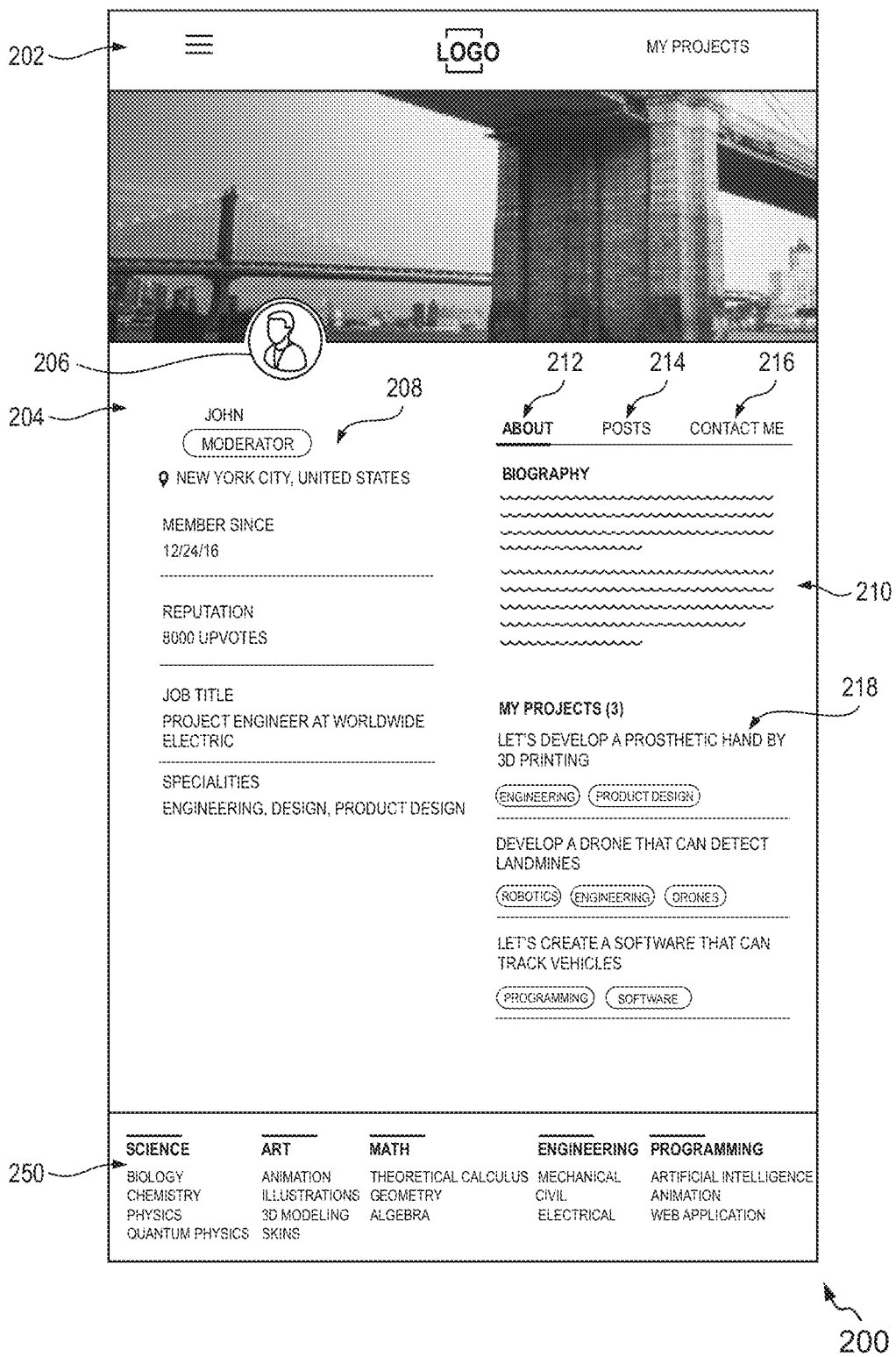
Figure 3:
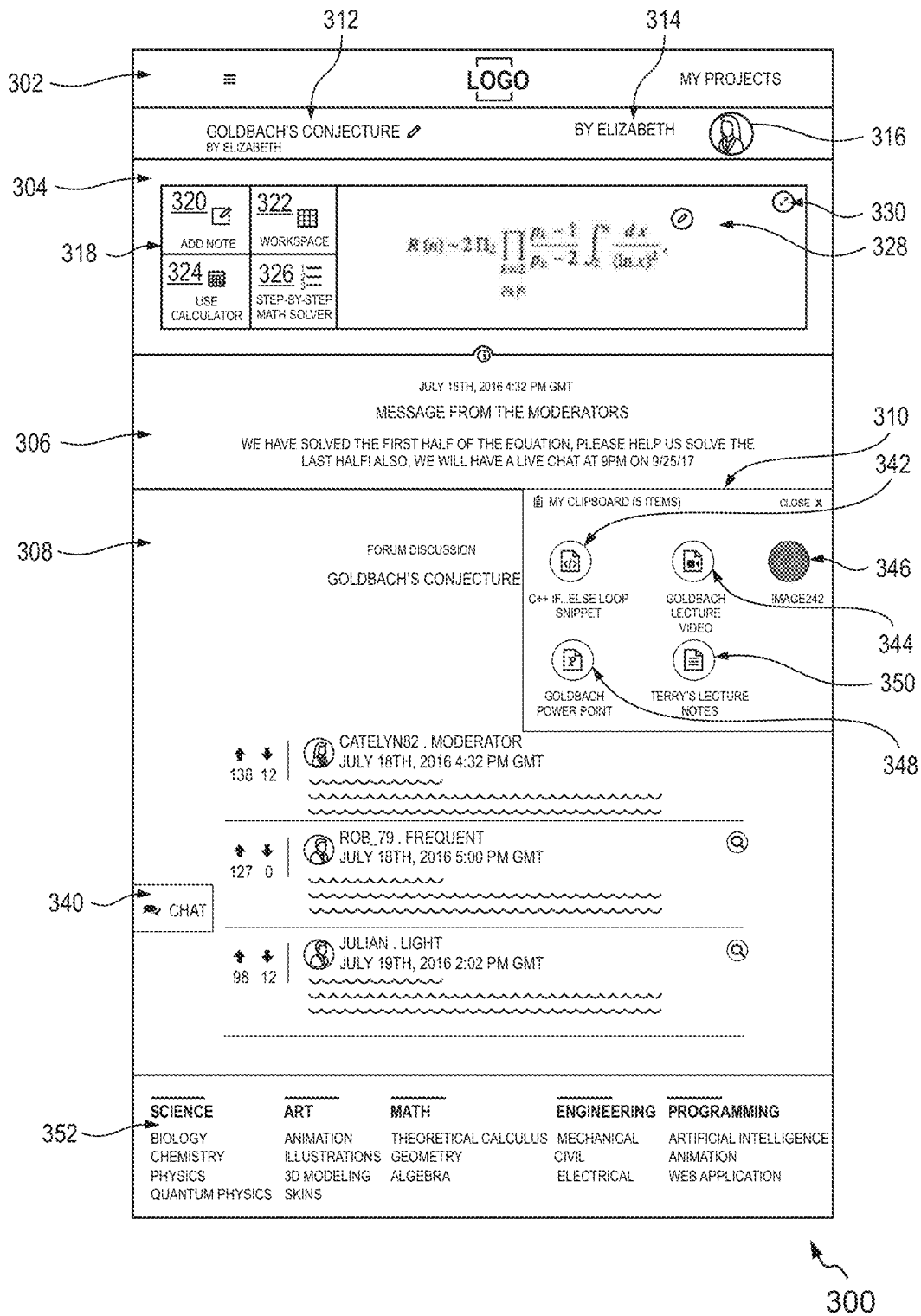
Figure 4:
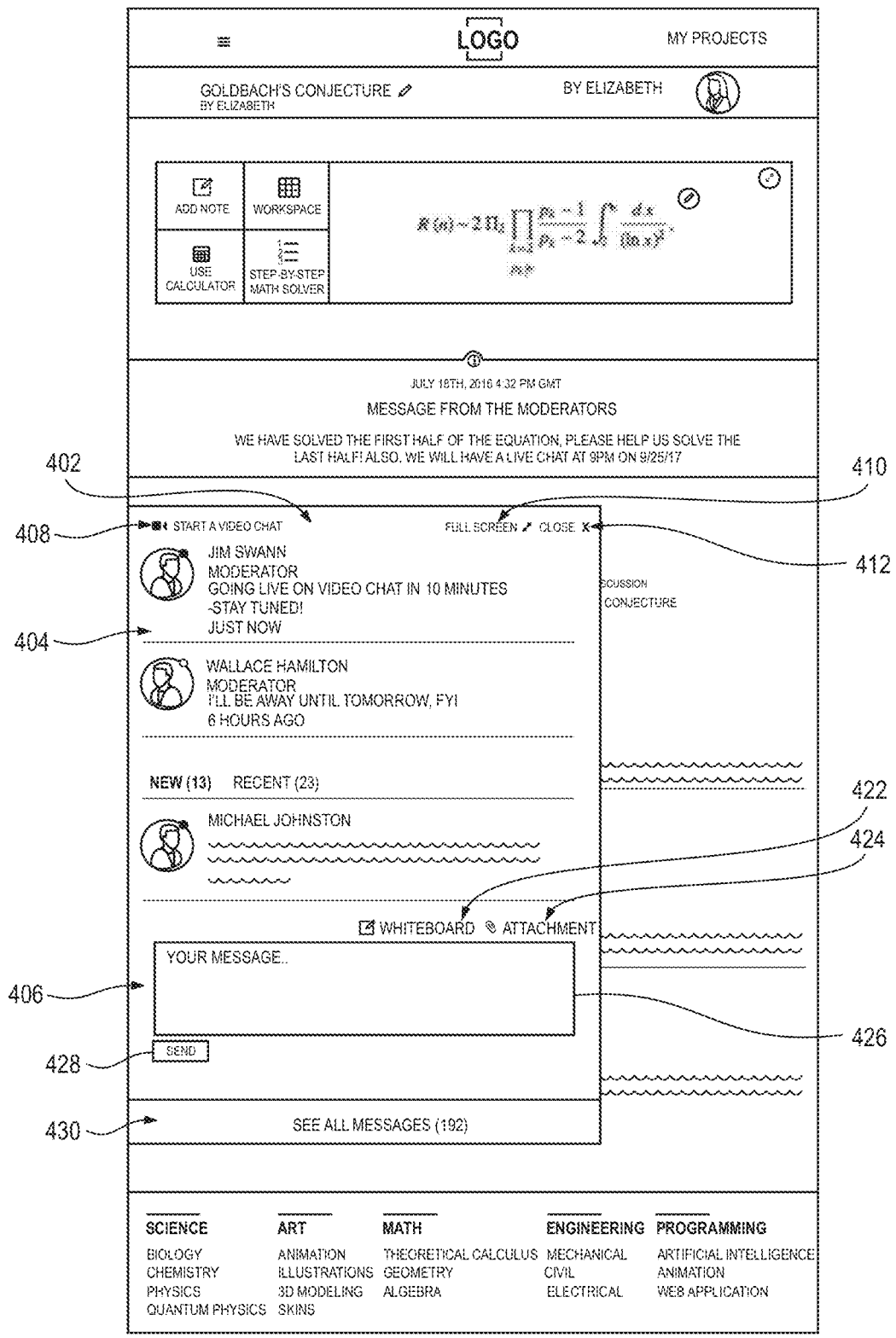
Figure 5:
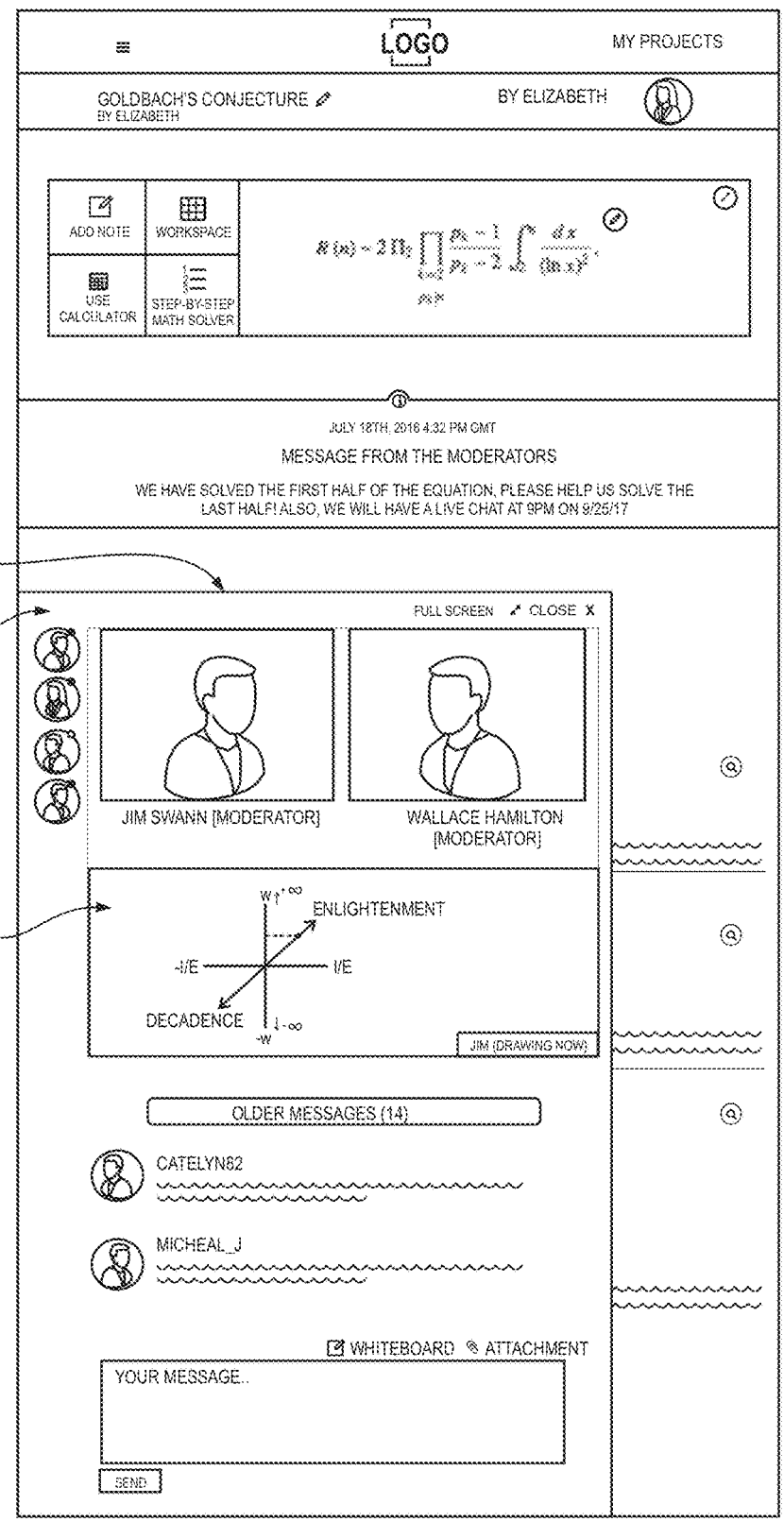
Figure 6:
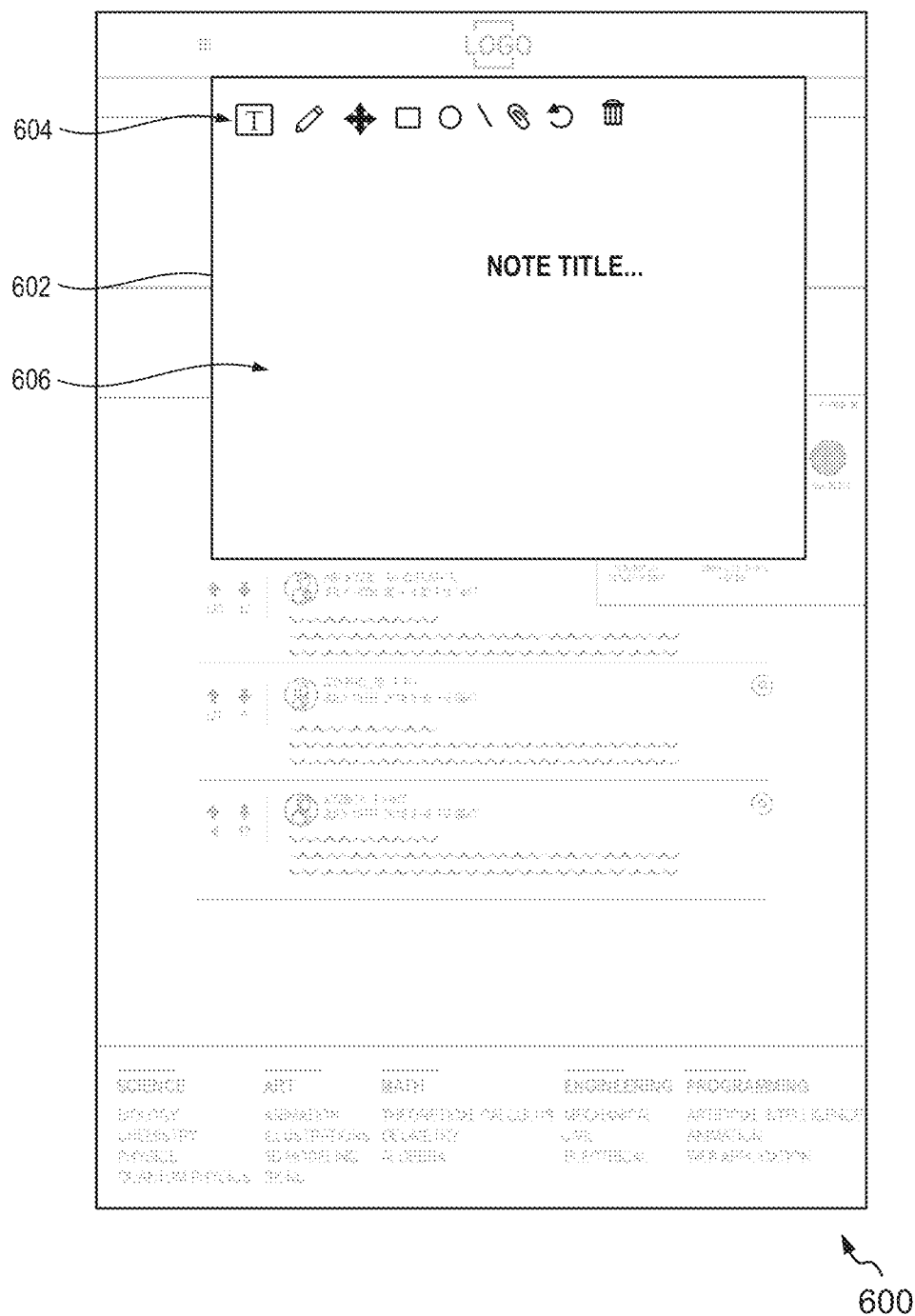
Figure 7:
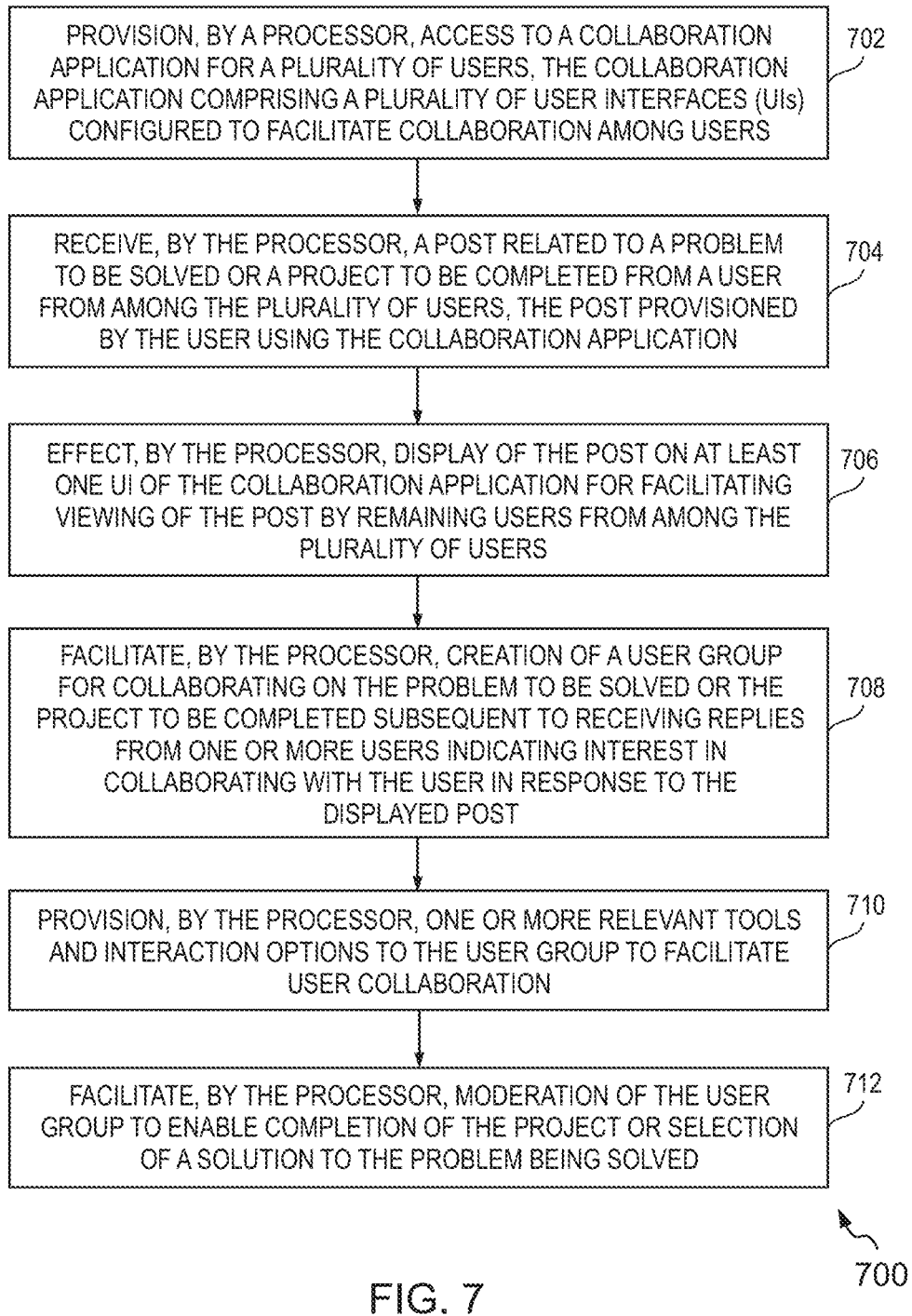
Figure 8:
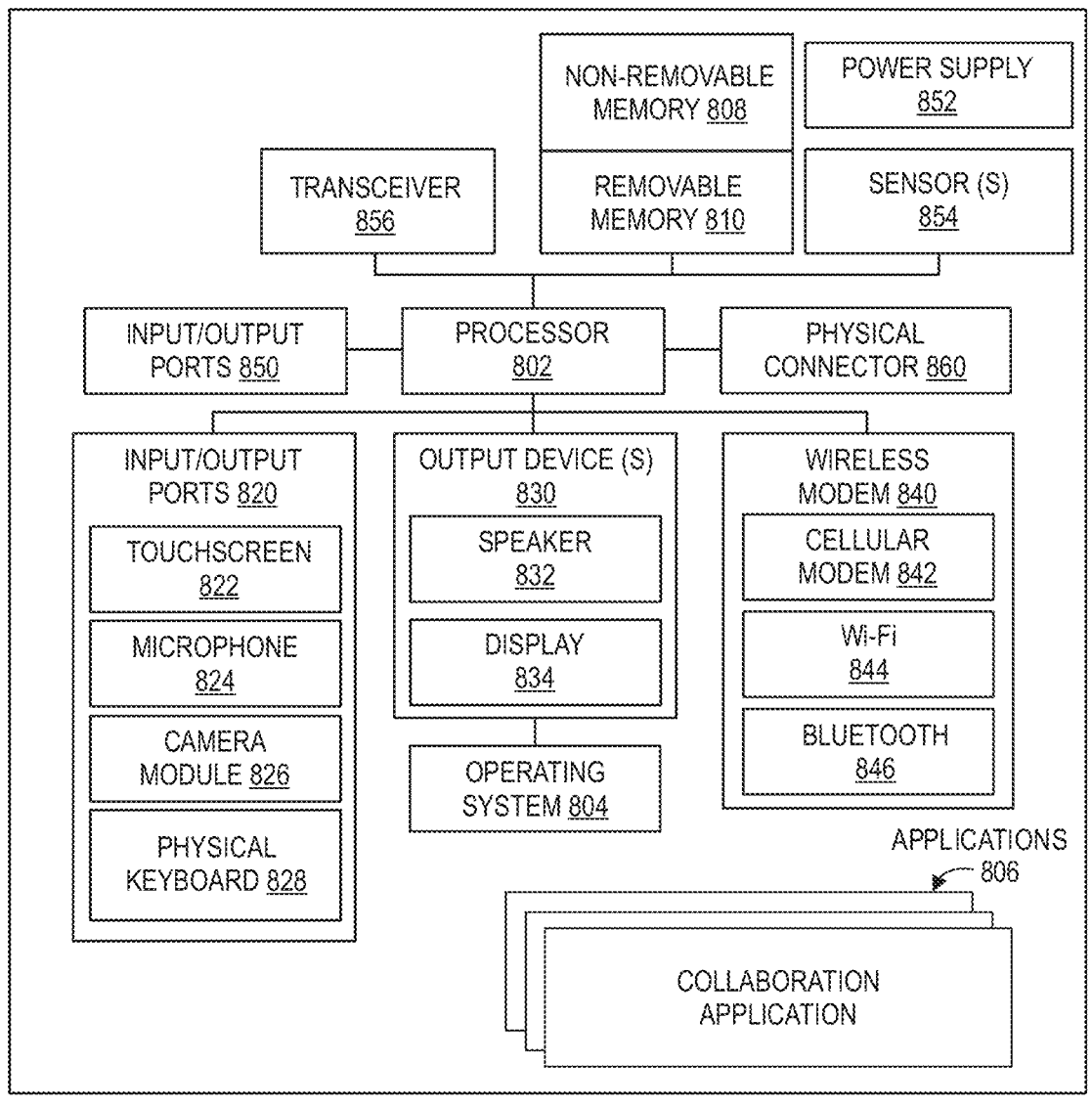
Figure 9:
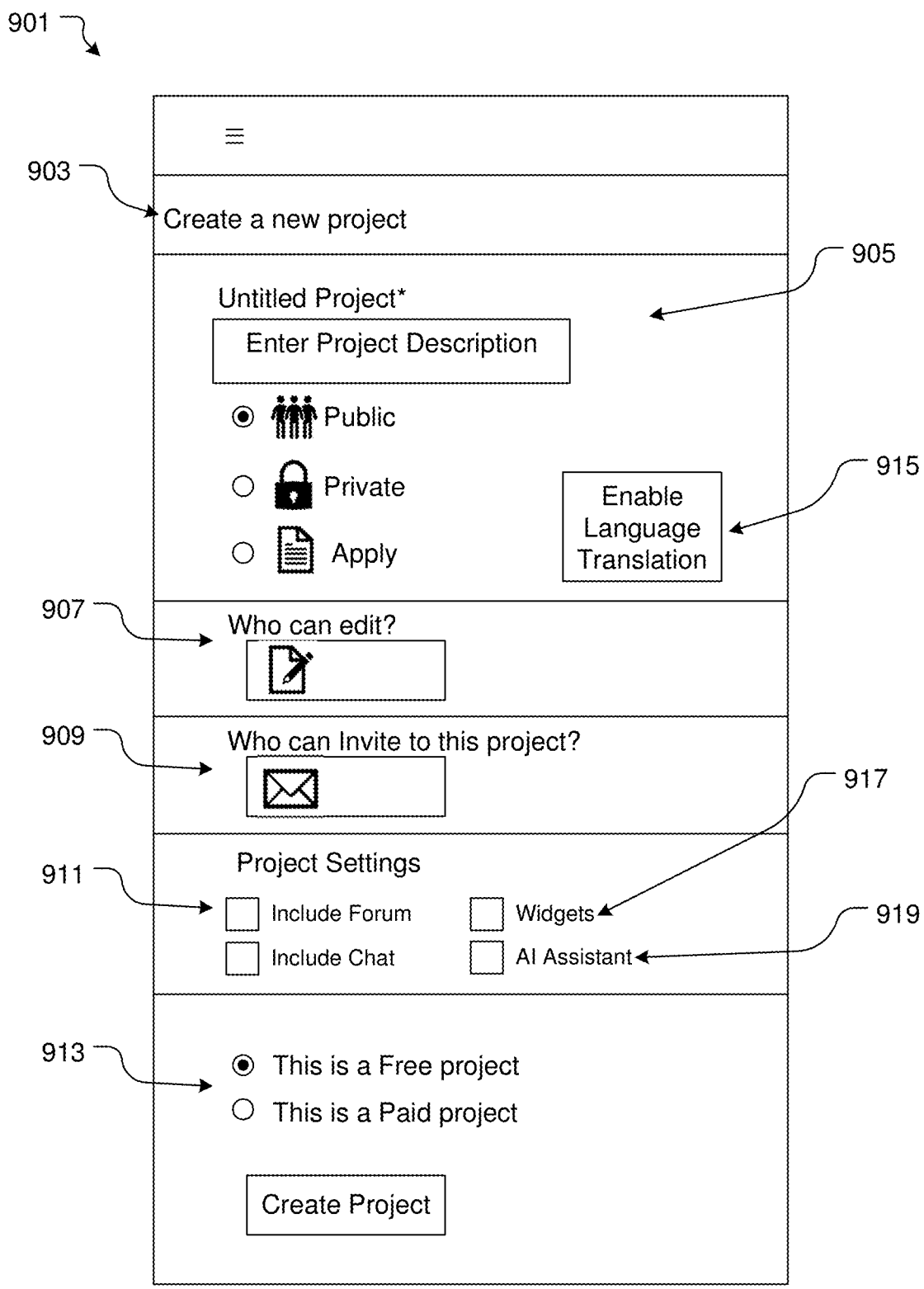
Figure 10:
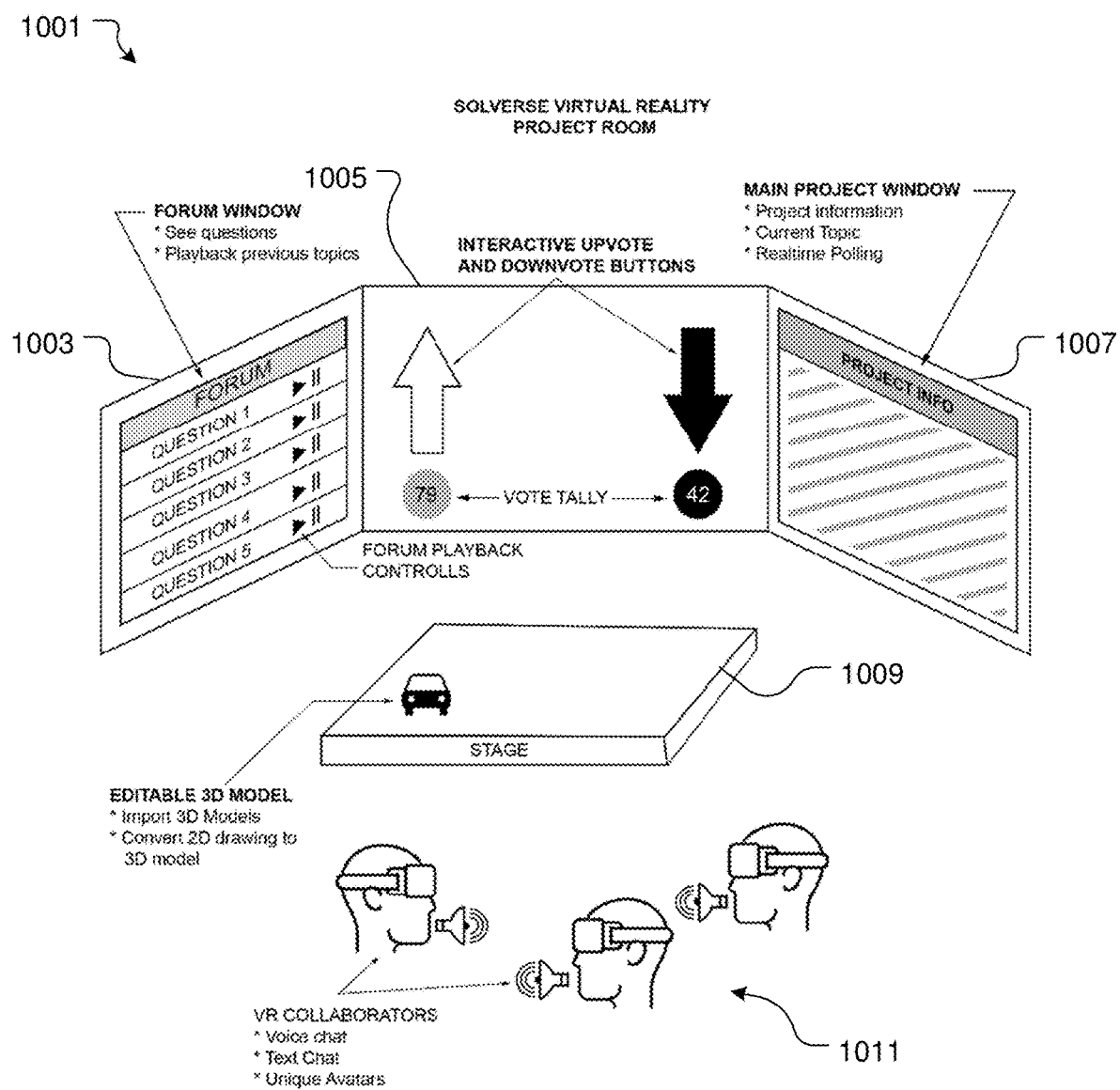
Figure 11:
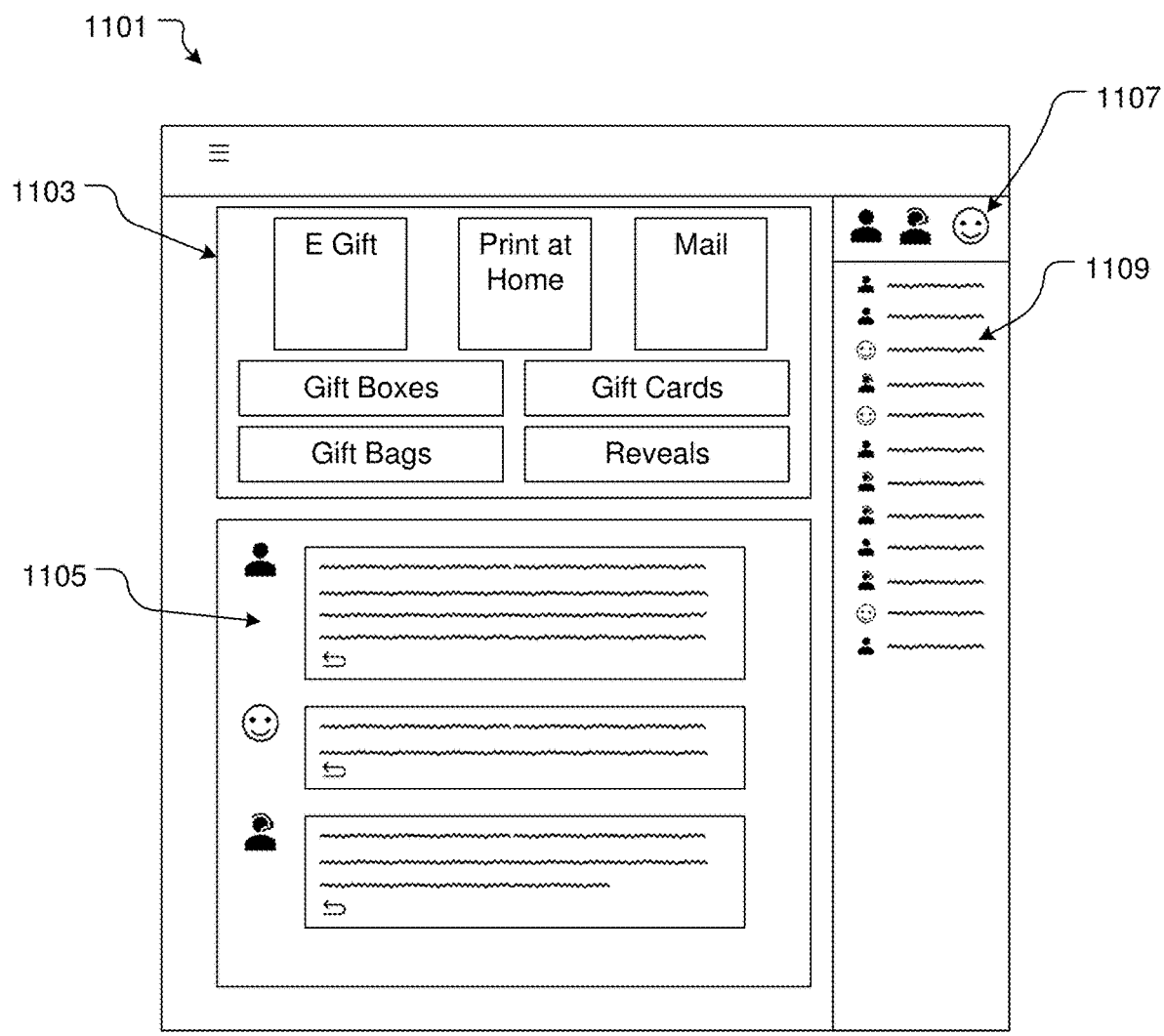

For a more complete understanding of example embodiments of the present technology, reference is now made to the following descriptions taken in connection with the accompanying drawings in which:

FIG. 1A illustrates an example environment in which various embodiments of the invention may be practiced;

FIG. 1B shows a user interface (UI) presented to a user on an electronic device upon accessing the collaboration application, in accordance with an example embodiment;

FIG. 2 shows a UI displaying a user profile associated with an example user of the collaboration application, in accordance with an example embodiment;

FIG. 3 shows a UI of the collaboration application corresponding to a project posted on the collaboration application, in accordance with an example embodiment;

FIG. 4 shows a chat window displayed to the user upon selection of the chat option on the UI depicted in FIG. 3, in accordance with an example embodiment;

FIG. 5 shows an example representation of ongoing video chat interaction in the chat window of FIG. 4, in accordance with an example embodiment;

FIG. 6 shows a UI of the collaboration application displaying a project note window, in accordance with an example embodiment;

FIG. 7 is a flow diagram of an example method for facilitating user collaboration, in accordance with an example embodiment;

FIG. 8 illustrates an example of an electronic device capable of implementing example embodiments described herein;

FIG. 9 shows a UI of the collaboration application corresponding to a project creation event on the collaboration application, in accordance with an example embodiment;

FIG. 10 shows an alternative embodiment of the UI of the collaboration application corresponding to a project posted on the collaboration application; and FIG. 11 shows a UI of the collaboration application corresponding to a project page on the collaboration application, in accordance with an example embodiment.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

FIG. 1A illustrates an example environment 100 in which various embodiments of the invention may be practiced. The environment 100 depicts a system 102 including a database 104 and a collaboration platform 106. The collaboration platform 106 and the database 104 are communicably coupled with each other. For example, the collaboration platform 106 and the database 104 may be communicably coupled using wired means, wireless means, or a combination thereof.

The collaboration platform 106 includes at least one processor, such as a processor 108 and a memory 110. It is noted that although the collaboration platform 106 is depicted to include only one processor, the collaboration platform 106 may include more number of processors therein. In an embodiment, the memory 110 is capable of storing machine executable instructions, referred to herein as platform instructions. Further, the processor 108 is capable of executing the platform instructions. In an embodiment, the processor 108 may be embodied as a multi-core processor, a single core processor, or a combination of one or more multi-core processors and one or more single core processors. For example, the processor 108 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 108 may be configured to execute hard-coded functionality. In an embodiment, the processor 108 is embodied as an executor of software instructions, wherein the instructions may specifically configure the processor 108 to perform the algorithms and/or operations described herein when the instructions are executed.

The memory 110 may be embodied as one or more volatile memory devices, one or more non-volatile memory devices, and/or a combination of one or more volatile memory devices and non-volatile memory devices. For example, the memory 110 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.).

The memory 110 stores a collaboration application 112 capable of facilitating user collaboration. The collaboration application 112 includes a plurality of user interfaces (UIs) capable of enabling users to engage in active collaboration with other users to solve problems and/or complete projects. The UIs associated with the collaboration application 112 are explained in detail later.

The collaboration platform 106 also includes an input/output (I/O) module and a communication interface (not shown in FIG. 1). In an embodiment, the I/O module includes mechanisms configured to receive inputs from and provide outputs to the user of the collaboration platform 106. To that effect, the I/O module may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a microphone, a speaker, a ringer, a vibrator, a display, and the like. The I/O module also includes a display, which may be embodied as a light emitting diode display, a thin-film transistor (TFT) display, a liquid crystal display, an active-matrix organic light-emitting diode (AMOLED) display, or the like.

The communication interface may be configured to facilitate communication of the collaboration platform 106 with one or more Web servers. For example, the processor 108 of the collaboration platform 106 may be configured to store UIs of the collaboration application 112 as Web pages of a Website in a Web server to facilitate Web-based access to the collaboration application 112. The communication interface may be configured to facilitate communication between the collaboration platform 106 and the Web server storing the Web pages and to receive information related to user activity on the Web pages of the collaboration application 112. To that effect, the communication interface may include relevant circuitry for enabling transmission and reception of signals from the Web server. Furthermore, the communication interface may also be in communication with one or more application stores capable of storing instances of the collaboration application 112 and enabling download of the instances of the collaboration application 112 on electronic devices of the end users. To that effect, the communication interface may include relevant Application Programming Interfaces (APIs) for facilitating communication between the processor 108 and the application store(s) and/or electronic devices of the users using the collaboration application 112.

In an embodiment, various components of the collaboration platform 106, such as the processor 108 and the memory 110 (including the I/O module and the communication interface) are configured to communicate with each other via or through a centralized circuit system. The centralized circuit system may be various devices configured to, among other things, provide or enable communication between the components of the collaboration application. In certain embodiments, the centralized circuit system may be a central printed circuit board (PCB) such as a motherboard, a main board, a system board, or a logic board. The centralized circuit system may also, or alternatively, include other printed circuit assemblies (PCAs) or communication channel media.

The collaboration platform 106 is depicted herein to include at least one processor (such as the processor 108) and the memory 110 for illustration purposes. In some embodiments, the collaboration platform 106 may be implemented completely as a set of software layers on top of existing hardware systems. In at least one embodiment, the database 104 may be embodied as one or more volatile memory devices, one or more non-volatile memory devices, and/or a combination of one or more volatile memory devices and non-volatile memory devices.

It is noted that the system 102 may include fewer or more components than those depicted in FIG. 1. Moreover, the system 102 may be implemented as a centralized apparatus, or, alternatively, the components of the system 102 may be deployed in a distributed manner while being operatively coupled to each other. In an embodiment, the system 102 may be embodied as a mix of existing open systems, proprietary systems and third party systems. In an exemplary scenario, the system 102 may be any machine capable of executing a set of instructions (sequential and/or otherwise) so as to facilitate user collaboration and enable users to collaborate with a plurality of individuals for completing projects and/or solving problems.

In at least one example embodiment, the processor 108 of the collaboration platform 106 is configured to provision access to the collaboration application 112 to a plurality of users. As explained above, the collaboration application 112 may be configured as a Web-based application or a native mobile device application. The user may access the collaboration application 112 using respective electronic devices. For example, users, such as the users 114, 116, 118 and 120, may access the collaboration application 112 using electronic devices, such as electronic devices 122, 124, 126 and 128, respectively. Non-exhaustive examples of the electronic devices may include electronic devices, such as mobile phones, laptops, Smartphones, tablet devices, wearable devices, and the like. The collaboration application 112 may be accessed over a communication network, such as a network 130. Examples of the network 130 may include, but are not limited to, a wired network, a wireless network, or a combination thereof. Examples of wired network may include Ethernet, local area network (LAN), fiber-optic cable network and the like. Examples of wireless network may include cellular network like GSM (global system for mobile communication), 3G (third-generation), 4G (fourth-generation), CDMA (code division multiple access) based network, wireless LAN, Bluetooth® network, Zigbee® network, and the like. An example of a combination of wired and wireless network may include the Internet.

In scenarios, where the collaboration application 112 is embodied as a Web-based application and the plurality of UIs of the collaboration application 112 are stored as Web pages, the users may use a Web browser application installed in their respective user devices to communicate with the Web server and access the collaboration application 112. The one or more UIs corresponding to the collaboration application 112 are explained with reference to FIGS. 1B to 6. Further, as explained above, the collaboration application 112 may also be embodied as a native mobile device application. In such a scenario, the collaboration application 112 may be provisioned to the users upon user request. For example, a user may access an application store associated with an operating system (OS) installed in the user's electronic device to request the collaboration application 112. Upon receipt of such a request, the processor 108 of the collaboration platform 106 may be configured to provision the collaboration application to the user's electronic device. It is understood that though the user can request the collaboration application 112 using the application store, however, in some cases the collaboration application 112 may be factory-installed within the user's electronic device. In such a case, the provisioning of the collaboration application 112 by the collaboration platform 106 may imply downloading of the collaboration application 112 during device manufacture or at any stage prior to purchase of the user device by the user.

In an embodiment, the collaboration application 112 (hereinafter interchangeably referred to as 'application') is configured to enable a large number of users to collaborate on a single problem or a single project at the same time. The problems/projects may range from scientific formulas to art projects to birthday parties. Some non-exhaustive examples of problems may include inventing a cure for a disease such as cancer or Alzheimer, determining a solution to an unsolved mathematical problem, drafting a constitution for a country, identifying ways to combat climate change, improving a quality of air in metropolitan cities, identifying ways to provide potable water for drought-affected areas, creating energy-efficient sustainable designs for cities, and the like. Some non-exhaustive examples of the projects to be completed may include completing an art project, creating software, organizing a theatrical performance, compiling census data, completing a statistical survey, managing an event, and the like.

In at least some embodiments, the collaboration application 112 enables users to post a problem to be solved or a project to be completed. More specifically, a user may utilize a UI for posting a problem to be solved or a project to be completed. The processor 108 of the collaboration platform 106 may be configured to receive the post using the communication interface and effect display of the post on one or more UIs of the collaboration application 112 so that remaining users of the collaboration application 112 may view the post. Some examples of display of user posts are depicted in FIGS. 1B to 6 and will be explained in detail later.

In at least one example embodiment, upon viewing the displayed post, one or more users may show interest in collaborating with the user in solving the problem or completing the project. For example, a user may reply to the post or click a like option or initiate an interaction with the creator of the post to show interest. In some embodiments, the user may invite specific users to collaborate on a project and their acceptance to be a part of the collaborative effort may serve as a reply showing interest in collaborating with the user.

In at least one example embodiment, the processor 108 of the collaboration platform 106 may facilitate creation of a user group for collaborating on the problem to be solved or the project to be completed subsequent to receiving replies from one or more users indicating interest in collaborating with the user. More specifically, the creator of the post along with one or more interested users may configure a virtual group. The processor 108 of the collaboration platform 106 may facilitate invitation of members as well as allocation of separate workspace (for example, a separate UI) to facilitate creation of a user group. In an illustrative example, a user of the collaboration application 112 may provide a click input on a tab on a member page to indicate desire to initiate a new project. The processor 108 may facilitate creation of a new UI upon receiving such an input, and thereafter the user may post a problem to be solved or a project to be completed on the UI. The processor 108 may also enable the user to add interested members or invite specific users to collaborate on the project using the UI. Such an UI upon addition of new members may configure the UI, for example, a home page, of the problem to be solved or the project to be completed. In at least one example embodiment, the UI may be configured to provide a shared workspace to the user group for collaborating on solving the project or completing the project.

In at least one example embodiment, the creator of the post may, in at least some embodiments, be identified as a moderator of the user group. In some embodiments, the collaboration application 112 may enable the creator of the post, i.e. the moderator, to choose one or more members of the user group as additional moderators for the user group, based on the level of interest and/or expertise. The moderator may be empowered to invite individuals from among field experts, research scientists, academicians, users from relevant organizations and general public to collaborate on the problem to be solved or the project to be completed.

In an embodiment, the moderator may invite individuals using respective user names. For example, the moderator may invite one or more known contacts (peers at the organization, friends, acquaintances, and the like). However, if an individual to be invited is not an existing user of the collaboration application 112, then the moderator may enter an email ID of the participant in a separate box displayed on the UI of the project. The processor 108 of the collaboration platform 106 may be configured to contact the individual using the email ID and invite the individual to be a user of the collaboration application 112. If the individual accepts the invitation, the project may be displayed on the individual's profile page. In at least one example embodiment, the project page is continuously updated to enable the moderator to view a status of all invitations. For example, if the moderator has invited 'John' to collaborate on a project and John has accepted the invitation, then accepted status of invitation may be displayed to the moderator, such as for example by using 'John (Accepted)' tag on the invitation display section. In an embodiment, the collaboration application 112 may also enable a moderator to email a Website link, i.e. a hyperlink, to an individual to request the individual to become a member and use the collaboration application 112.

In some embodiments, the moderator may be empowered to choose whether a respective project is to be listed in search results displayed to users searching for new projects to collaborate on. For instance, in some example scenarios, the moderator may want to limit a number of collaborators to a specific number or may believe that the necessary experience/expertise for completing a project or solving a problem has been achieved, and as such, may prefer to keep the project private. Accordingly, the moderator may choose to keep the project 'private'. It is noted that the existing members of the user group may still be able to view the project in their projects page, automatically.

In some embodiments, the moderator may choose to retain the public status of the project and individuals may be requested to apply to be a part of the collaborative user group. When an interested user clicks on a project of interest, the user may be provided with a screen displaying content related to project description and a listing of requisite qualities for being a part of the user group collaborating on the project. Further, an option to provide a message to the moderator may also be displayed to the interested user. The interested user may choose to apply to the project or ignore being a part of the project. If the user chooses to apply, then the user may provision a message to the moderator along with other credentials and the moderator may then decide to provide access to the interested user or not.

As explained above, the UI provides a shared workspace for members of the user group to collaborate on. In at least one example embodiment, the moderator may use the UI to upload and share of one or more content files related to the problem to be solved or the project to be completed. The shared workspace of the UI also allows group members to create live text documents that can either be edited via the posting system or a moderator can allow the documents to be edited by any member of the group. A particular user can post his/her ideas for the problem/project posted by the moderator, and his/her idea is then up voted or down voted by other individuals (whether group members or other individuals) depending upon which the moderator or other users may pay attention to the idea with highest number of up votes. However, a post despite of its votes may be picked and implemented as a solution for the project by the moderator(s) at his/their sole discretion. As such, facilitating such a moderation of a user group by the creator of the post or additional moderators enables arriving at a solution to a problem or to complete a project.

In an embodiment, the shared workspace is configured to facilitate at least one of live creation of two-dimensional or three-dimensional content, real-time scribbling or drawing of notes, live creation of software content, live creation of musical or art content and live editing of at least one of documents and video content. In one embodiment, the project UI may include a coding window and a testing window configured to enable the user group to collaborate on creating software. More specifically, the coding window is configured to receive a plurality of lines of code from one or more users from among the user group, and the testing window is configured to facilitate testing of the plurality of lines of code.

The collaboration application 112 also enables the moderator(s) to add tools and features to the project or problem that the users can then use during the course of problem solving or project completion. Some non-exhaustive examples of such tools and feature include an online whiteboard, a drawing tool, a calculator, a step-by-step math solver, a programming workspace, a live editable document feature, a drag and drop audio/video files feature, a clipboard feature, a note-making feature, and the like. The moderator may also add interaction options such as a live video chat feature, a text chat feature and an instant messaging feature to enable active collaboration. It is noted that the live video and text chat feature enables group members to interact in real time and in some example scenarios, the members may conduct live experiments, hold seminars and/or display performances in real time. The collaboration application 112 also enables group members to view past videos and text chats.

In some embodiments, the collaboration application 112 may be configured to display a pop-up window or a fixed window on a project/problem page for displaying updates from the moderator(s). For example, the moderator(s) may post the current status or a progress level of the project, which may be displayed in the window of the project/problem page so that other users may be informed about the status/progress level of the project. In some embodiments, the collaboration application 112 enables the moderator to perform any of: include a DONATE' button on their project page, to charge interested users to apply to the project, to make a payment to an expert (or any other user) to join the project, and the like.

The various user interfaces of the collaboration application 112 configured to facilitate user collaboration are explained hereinafter with reference to FIGS. 1B to 6. It is noted that user posts, whether related to a problem to be solved or a project to be completed, are referred to hereinafter as 'projects' for ease of description.

FIG. 1B shows a user interface (UI) 150 presented to a user on a user's electronic device upon accessing the collaboration application 112, in accordance with an example embodiment of the invention. The UI 150 corresponds to the home page of the collaboration application 112. As explained with reference to FIG. 1A, a user may request access to the collaboration application 112 by visiting a Website associated with the collaboration application 112 or by requesting for a download of the collaboration application 112 using an application store on the user's electronic device, which may in turn request the collaboration platform 106 to provision the collaboration application 112 to the user's electronic device. In at least one example embodiment, the UI 150 may be presented to the user on the display screen of the electronic device upon accessing of the collaboration application 112.

The UI 150 is depicted to include a first header section 152, a project listing section 154, a popular topics section 156, a signup section 158 and a field reference section 160. The first header section 152 is depicted to display a menu and settings option 162, a logo display 164, a search input field 166, a search field option 168, a search option 170, a login option 172 and a sign up option 174. The menu and settings option 162 is configured to enable the user to change various settings, such as user profile settings, project settings, contact information of the user etc., or display user profile. In one embodiment, the menu and settings option 162 may be used to add various external tools and features to be used by the users for particular projects. The logo display 164 is configured to display a logo associated with the collaboration application 112 or of the enterprise associated with the collaboration application 112. The search input field 166 is configured to receive text input from the user and may be used by the user to search for a project of interest. In one embodiment, the user may input the name of the topic in the search input field 166 for which the user wants information and further select the appropriate field in the search field option 168 to which the project might belong. In at least one example embodiment, the search field option 168 may include fields such as science, art, math, engineering, programming, etc. The user may then finally select the search option 170 to search for the project corresponding to which input is given in the search input field 166. In another example embodiment, the user may search for a particular topic without field-based restrictions (i.e. search among all projects).

A click or a touch input on the signup option 174 takes the user to a corresponding UI for creating an account and becoming a registered user. The creation of the account may involve providing unique user identification information (such as for example, a user name and a password). It is noted that information provided by the user during the course of the creation of the account may configure a user profile as will be explained later with reference to FIG. 2. Upon creating the account, the user may login into the collaboration application 112 using the unique user identification information, and thereafter, the user may be displayed a UI on which the user may post questions or projects to be solved and/or reply to posts from other users. In at least one example embodiment, the database 104 (depicted in FIG. 1A) may be configured to store all information related to registered users, such as for example user authentication information, posts of the user, tags for each post, UI settings information, groups that the user is part of, text and video chats involving the user, text and multimedia files associated with the user, and the like.

The project listing section 154 of the UI 150 includes a project classification section 176 and a project list 178. The project classification section 176 displays a most popular tab, a most recent tab and a 'By subject' tab. The most popular tab of the project classification section 176 is configured to display the most popular projects associated with the collaboration application 112. In one embodiment, upon selection of the most popular tab by the user, the projects which have maximum number of up votes and/or replies after the respective projects have been posted by the moderators are displayed as the most popular projects. The most recent tab of the project classification section 176 is configured to display the most recent projects posted by the users of the collaboration application 112. In one embodiment, the most recent projects are the ones that are posted recently and can be viewed on the project list 178 with the most recent one displayed at the top of the view. The 'By subject' tab is used by the users to select a particular subject for which the users want the projects to be displayed in the project list 178. In an illustrative example, the various subjects included in the 'By subject' section may be Biology, medicine, robotics, engineering, programming, etc.

The project list 178 is used to display various projects according to the selection made by the user. Each project displayed in the project list 178 displays a project/problem topic, one or more project classification tags, age of the post, a reply count and a vote count. In an illustrative example, the first project displayed in the project list 178 is associated with a project topic "Let's develop an immunotherapy cancer drug like imiquimod that can be applied to the skin". The project is depicted to be associated with four project classification tags, namely, 'Biology', 'Cancer', 'Medicine' and 'Treatments'. The project was posted 13 hours ago and is associated with 14 replies and 3 votes. It is understood that the reply count corresponds to the number of replies the project has received since it was posted. The vote count displays the numbers of votes received by the project after it was posted. In one embodiment, the project list 178 may include multiple projects and include details for each project as explained above. In at least one example embodiment, the user may click on a "view more projects" option in order to view all the projects.

As explained with reference to FIG. 1A, in some embodiments, a project moderator may choose to retain the public status of the project (such that the project shows in user search results) but individuals wishing to collaborate on the project may have to apply to be a part of the collaborative user group. Accordingly, the project topic "Let's develop an immunotherapy cancer drug like imiquimod that can be applied to the skin" in the project list 178 is depicted to be associated with button 180 displaying text 'APPLY'. When an interested user clicks on the button, the user may be provided with a screen displaying content related to project description and a listing of requisite qualities for being a part of the user group collaborating on the project. In some embodiments, a monetary charge to join the user group may also be displayed to the interested user. However, it is noted that a number of projects displayed on the collaboration application 112 may request interested users to join and collaborate based on mutual interest and may preclude any monetary charges. In some embodiments, an option to provide a message to the moderator may also be displayed to the interested user. The interested user may choose to apply to the project or ignore being a part of the project. If the interested user chooses to apply, then the interested user may provision a message to the moderator along with other credentials and the moderator may then decide to provide access to the interested user or not.

The popular topics section 156 consists of the most popular topics of discussion/project associated with the collaboration application 112. In one embodiment, the popularity of the topics is decided by the number of the votes and/or replies made by the users. The UI 150 exemplarily displays the popular topics to be space travel, coding, artificial intelligence, drones, art, new transportation, renewable energy, purifying water, immunization, robotics, communication and medications. It is noted that the popular topics section 156 may display more or less number of topics than those displayed on the UI 150, depending upon the number of votes and replies provided by the users. In one embodiment, a user may select a popular topic from among the popular topics displayed in the popular topics section 156 to view all the projects related to that topic.

The signup section 158 displays a text field capable of receiving an email address and a corresponding clickable button associated with text 'signup'. A user may input his/her email address and click on the signup option to sign up for receiving the project updates of projects that interests him/her.

The field reference section 160 displays all the disciplines relating to which the projects can be posted by the users. The field reference section 160 of the UI 150 is exemplarily depicted to display disciplines like "Science", "Art", "Math", "Engineering" and "Programming". These disciplines are further associated with sub-disciplines, such as for example, the sub-disciplines for the field "Science" include "Biology", "Chemistry", "Physics" and "Quantum Physics". In an embodiment, the various disciplines in the field reference section 160 may be selected by the user to access all the projects related to that discipline. For example, the user may select the "Physics" discipline to view all the projects posted by other users and that are related to physics.

As explained above, a user creates a user profile during the course of creating an account with the collaboration application 112. An example user profile is depicted in FIG. 2.

FIG. 2 shows a UI 200 displaying a user profile associated with a user 'John' of the collaboration application 112, in accordance with an example embodiment. John is exemplarily depicted to be a moderator in UI 200. As explained with reference to FIG. 1A, a user of the collaboration application 112 may create an account and generate a profile. The user profile, once-created, may be accessed using the menu and settings option 162 on the UI 150 by the user 'John' himself, or by other users, by clicking on John's profile picture displayed when John replies to another user's posts or when John posts a project on the collaboration application 112.

The UI 200 includes a second header section 202, a profile information section 204 and a field reference section 250. The field reference section 250 of the UI 200 is same as the field reference section 160 of the UI 150, and is not explained again herein. The second header section 202 of the UI 200 is configured to show a menu and settings option and a logo display, which are similar to the menu and settings option 162 and the logo display 164 explained with reference to FIG. 1B and are not explained again herein. The profile information section 204 is configured to display a profile picture 206 of the user John. The profile information section 204 further includes a personal information section 208 and project and post information section 210. The personal information section 208 is configured to display the name of the user (i.e. John), user identity (for example, moderator), location information (for example, New York, United States of America), membership information (for example, a member joining date), a reputation score (exemplarily depicted to be 8000 upvotes), a job title (exemplarily depicted to be Project Engineer at Worldwide Electric) and specialties (exemplarily depicted to be engineering, design and product design). It is noted that the user profile may include fewer or more fields than those displayed in the personal information section 208. In at least some embodiments, the user may choose to retain certain information as private and preclude their display on the user profile when viewed by other users.

The project and post information section 210 displays an 'About' tab 212, a 'Posts' tab 214, a 'Contact me' tab 216 and a projects section 218. The 'About' tab 212 is used to display moderator John's biographical information along with the various projects created and maintained by John, as exemplarily depicted in the projects section 218. More specifically, the projects section 218 displays a list of projects with each project associated with a topic and corresponding project classification tags. The 'Posts' tab 214 is used to display all the posts by John on projects that John is involved with. The 'Contact me' tab 216 when selected by another user is configured to provision information, such as email id, mobile number among other contact information for John.

The selection of one of the projects from the projects section 218 is configured to present an UI associated with the details of a particular project. Such an UI is explained with reference to FIG. 3.

Referring now to FIG. 3, a UI 300 of the collaboration application 112 corresponding to a project posted on the collaboration application 112 is shown, in accordance with an example embodiment. As explained with reference to FIGS. 1A to 2, users may post projects or problems on the collaboration application 112 and invite specific users for collaboration or solicit assistance from general public. The UI 300 corresponds to a project related to solving a mathematical problem titled 'Goldbach's Conjecture' posted by a user Elizabeth. The user Elizabeth may post one or more such problems and then view individual UIs corresponding to those posts by clicking on the 'My Projects' option displayed in the projects section on the user profile UI, such as the projects section 218 on the UI 200 explained with reference to FIG. 2.

The UI 300 is depicted to include a third header section 302, project information and tool section 304, a message section 306, a forum discussion section 308 and a clipboard section 310. The UI 300 also includes a field reference section 352 which is similar to the field reference section 160 of the UI 150 explained with reference to FIG. 1B, and is not explained again herein.

The third header section 302 displays a project name 312 (exemplarily depicted to be 'Goldbach's conjecture') and a project initiator name 314 (exemplarily depicted to be Elizabeth). The third header section 302 also displays a profile picture 316 of the user (i.e. Elizabeth). The third header section 302 also includes a menu and settings option and a logo display, which are similar to the menu and settings option 162 and the logo display 164 explained with reference to FIG. 1B and are not explained again herein.

As is known, 'Goldbach's conjecture' is one of the oldest and best-known unsolved problems in number theory, which states that every even integer greater than 2 can be expressed as the sum of two primes. The conjecture has not been mathematically proven and the user Elizabeth may have posted the mathematical problem as a project, so that a large number of individuals (mathematicians, math professors, students or general academia etc.) from different locations can contribute in solving the conjecture.

The project information and tool section 304 of the UI 300 includes a tools section 318 and a project information section 328. The tools section 318 displays various tools such as a add note tool 320, a workspace tool 322, a calculator tool 324 and a step-by-step math solver tool 326 that Elizabeth (or one or more moderators assigned by Elizabeth) can add to the project so that the users can use them while solving the mathematical problem. The add note tool 320 lets the moderator and other users to add a note file to the project, which the other users can view. In one embodiment, the add note tool 320 can be used by the users to draw or scribble certain notes on the project window. The workspace tool 322 allows the moderator to contribute to a common workspace that the users can edit live and at their discretion, or, conversely, by a voting system where the moderator will choose what to allow. In some example embodiments, the workspace may include a 'sandbox environment' using which all kinds of software can be created in real time. It is to be noted that if the project is live, then a document, a video or a software program may be running in the project workspace window and the users can edit it in real-time or alternatively the moderator can use the vote system to add or subtract an idea to the project at his/her discretion. For example, by using the workspace tool 322 users may be able to create art, create 3D or 2D images and video, edit an ongoing live programming project and the like. In at least one embodiment, when a user wants to draw on the project workspace window, he can click the edit button and a drawing/text bar will appear above the project window. After he/she draws or edits they can save their edits. Then, when that person's post is clicked, the drawing will be superimposed on top of the project window so you can see what any poster has drawn by clicking on their post. A user can also respond to a post, which will have a line and color that denotes that it is a response to a particular post.

The calculator tool 324 may be used by a user or the moderator to perform complex arithmetic operations. For example, as depicted in the UI 300 the users may require calculator for solving the Goldbach's conjecture equation and arrive at a solution. The step-by-step math solver tool 326 of the UI 300 may be added and used to solve various algebraic and mathematical equations, inequalities or graphs and to receive the result in the form of text, graph etc. The tools section 318 may preclude or include one or more tools depending upon the moderator. It is noted that provisioning of such math-based tools for solving mathematical problems substantially improves a quality of interaction as the users can then focus on solving the problems or completing projects without having to worry about establishing tool compatibility amongst group members to initiate interaction. It is noted that for problems or projects from different domains, different set of tools, which are most likely to be helpful for those domains, may be provisioned by the collaboration application 112.

The project information section 328 of the UI 300 is used to display the information of the project posted by the user. For example, as can be seen in the UI 300 the project information section 328 displays the Goldbach's conjecture equation, which needs to be solved as a part of the project. The project information section 328 is also associated with an editing option for the user/moderator to edit the project information or details of the project, which may then be viewed by other users involved in the project. Furthermore, the project information section 328 includes a screen size adjustment option 330, which may be used to maximize or minimize a size of window associated with the project information section 328. In some embodiments, the creator of the post, such as Elizabeth or the other moderator(s) may add a DONATE' button (not shown in FIG. 3) on the project information section 328 of the UI 300 to solicit donations for the project.

The message section 306 is configured to display messages from the moderator(s) of the project. The messages may correspond to status updates related to the project or may be indicative of the current progress of the project. The messages are associated with respective timestamps indicative of the time of posting the corresponding message. In the message section 306, an example message We have solved the first half of the equation, please help us solve the Last half! Also, we will have a live chat at 9 pm on 9/25/17' is depicted to be displayed. For users of the project accessing the project page (i.e. the corresponding UI), a pop-up window showing the moderator messages may be displayed by the collaboration platform 106.

The forum discussion section 308 of the UI 300 shows all the posts and/or replies provisioned by various users of the project. In an illustrative example, three users, Catelyn, Rob and Julian are depicted to have posted in relation to the Elizabeth's post on Goldbach's conjecture. Each post is associated with user information, post content, an up vote count and a down vote count. In an illustrative example, the user information for the user 'Catelyn' is depicted to display her profile name (i.e. Catelyn82), her profile picture, date and time of posting, and membership state (for example, whether the user is the moderator, avid user, frequent user, moderate user, light user or new user). Catelyn's response to the Elizabeth's post on Goldbach's conjecture is captured in the post content. It is noted that only a portion of the post content is displayed on the UI 300 and that the entire post content may be read by a user by clicking on the post content. In some embodiments, the post content may also display a number of replies received on the post. In the UI 300, Catelyn's response is depicted to have received 138 up votes and 12 down votes; Rob's response is depicted to have received 127 up votes and no down votes; and Julian's response is depicted to have received 98 up votes and 12 down votes. It is noted that the highest rated posts (i.e. the posts associated with most number of up votes) are shown at the top in the forum discussion section 308.

The forum discussion section 308 also shows a chat option 340 which may be used by the users for live chatting with others users related to the project. In one embodiment, the chat option 340, upon being accessed, is configured to display a chat interface to the user. In at least one example embodiment, the chat option 340 may be capable of facilitating live text chat, video chat or both depending upon the settings selected by the moderator(s) of the project. It is noted that a live video and text chat feature may allow users to solve issues and discuss them in real time as well as hold live experiments, seminars, and performances in real time. In an embodiment, the chats are saved, for example in the database 104 explained with reference to FIG. 1A, for future reference and hence the users can also see past videos and text chats whenever they wish to.

The clipboard section 310 of the UI 300 displays icons corresponding to a reference code snippet 342, a reference video 344, a reference image 346, a reference PowerPoint 348 and a reference note file 350. As explained above, project initiator (i.e. Elizabeth) and/or other moderators may add various text files, video files, audio files, and web links into the clipboard, which can then be dragged and dropped by the users into their post for viewing different types of data useful for completing the project. The reference snippet 342 corresponds to a code snippet "C++ if else loop snippet" copied on the clipboard by the moderator. The reference video 344 corresponds to a "Goldbach Lecture video" added to the clipboard section 310 by the moderator. The reference image 346, the reference PowerPoint 348 and the reference note file 350 correspond to an image "image 242", PowerPoint file "Goldbach power point", and a note file "Terry's lecture notes", respectively, which are added by the moderator(s) on the clipboard section 310.

The reference snippet 342, the reference video 344, the reference image 346, the reference PowerPoint 348 and the reference note file 350 may be thereafter dragged from the clipboard section 310 and dropped by individual users on the project window for further use by the users working on the project. In one embodiment, the clipboard section 310 can be minimized or expanded according to the need of the user.

Referring now to FIG. 4, a chat window 402 displayed to the user upon selection of the chat option 340 on the UI 300 is shown, in accordance with an example embodiment. The UI 300 is explained with reference to FIG. 3 and is not explained again herein.

The chat window 402 includes a participant section 404 and a message section 406. The participant section 404 displays image thumbnails for participants, such as other moderators (for example, Jim Swann and Wallace Hamilton) and other participants like Michael Johnston) with whom the user 'Elizabeth' can conduct a text or video chat with. In at least one embodiment, other participants may click on an image thumbnail (or on the accompanying name) of the moderator to access a moderator page of the corresponding moderator. The moderator page is explained in further detail later. Each image thumbnail is also associated with latest chat message from the corresponding participant to Elizabeth. The chat message sent by the moderators may be common to the project group, whereas other messages, like those from Michael may be personal chat messages to Elizabeth. The chat interaction messages may also be classified based on how 'new' or 'recent' they are, as exemplarily depicted using respective tabs.

The chat window 402 further displays a video chat option 408, a chat window size adjustment option 410 and a close option 412. The video chat option 408 may be used to initiate a video chat among the various participants involved in completing the project and will be explained in further detail with reference to FIG. 5. It is to be noted that the video chat option will allow users to discuss the project or related topic in real time. The chat window size adjustment option 410 may be used to expand the chat window 402 to assume full screen dimensions or to minimize the chat window 402 based on the need of the user. The close option 412 may be used to close the chat window 402. In one embodiment, the user may be displayed the UI 300 precluding the chat window 402, as displayed in FIG. 3, if he/she selects the close option 412.

The message section 406 in the chat window 402 includes a whiteboard option 422, an attachment option 424, a message box 426, a send option 428 and a 'See all messages' option 430. In at least one embodiment, a whiteboard may pop out on selection of the whiteboard option 422. The whiteboard option 422 may be used by the user 'Elizabeth' or other users (including moderators) to access a whiteboard and scribble or draw content during an ongoing interaction to aid visualization or to improve quality of the ongoing interaction. The drawn/scribbled content can be saved to the person's post and to their clipboard as well, if they want to save the whiteboard to their computer or personal storage clipboard. The attachment option 424 may be used to attach different types of files such as a text file, an image file or a video file, which can then be downloaded by the other users in order to view it. The message box 426 is configured to receive a text input, which may then serve as a chat message from Elizabeth to its intended recipient. The send option 428 is used to send the message typed in the message box 426.

As can be seen from the chat window 402, a limited number of chat messages are currently being displayed. The 'See all messages' option 430 may be used by Elizabeth to view all the chat conversations between Elizabeth and other users.

FIG. 5 shows an example representation of ongoing video chat interaction 500 in the chat window 402 displayed on the UI 300, in accordance with an example embodiment. The UI 300 is explained with reference to FIG. 3 and is not explained again herein. The various features of the chat window 402, such as the whiteboard, message box, attachment, chat window adjustment feature and the like, are explained with reference to FIG. 4 and are also not explained again herein.

The video chat may be initiated upon user selection of the video chat option 408 explained with reference to FIG. 4 or may be initiated by a moderator associated with the project 'Goldbach's Conjecture'. The ongoing video chat interaction 500 is depicted to display video feeds of moderators 'Jim Swann' and 'Wallace Hamilton' and other users such as users 'Michael Johnston', 'Catelyn' and 'Julian'. In one embodiment, one or more users, who are participants to the video chat interaction, may choose not to share live video feed. Further, the whiteboard is depicted to display a graph 502 being currently drawn by one of the moderators 'Jim' for use in the current interaction. As explained above, the collaboration application enables users to discuss projects/problems in real-time and thereby facilitates more effective collaboration amongst users. Further, the users can add notes, which then can be shared amongst participants. A UI showing a project note window is depicted in FIG. 6.

Referring now to FIG. 6, a UI 600 of the collaboration application displaying a project note window 602 is shown, in accordance with an example embodiment. The UI 600 is displayed to a user when he/she selects the add note tool, such as the add note tool 320 of the UI 300 (explained with reference to FIG. 6). The project note window 602 includes a note tools section 604 and a note space 606. The project note window 602 may be accessed when the user or the moderator clicks on the add note tool option in order to create a note for self or to make it visible to other users. The note tools section 604 includes various tools, which can be used for making a note. In one embodiment for example, the tools in the note tools section 604 may include text option, drawing option, inserting square or circular box option, attaching file option, an undo option, a delete option etc. The note space 606 is the space used to write or draw the notes. In one embodiment, the note space 606 may include a note title for its identification. It is noted that other users can see the notes drawn by a user on the project window by clicking on their post. Thereafter, the image of the notes may appear on the project/problem window and disappear when another post is clicked or when the user clicks on another part of the page.

As explained with reference to FIG. 4, participants may click on an image thumbnail (or on the accompanying name) of the moderator to access a moderator page for the corresponding moderator. The various facets of a moderator page are explained hereinafter.

A user creates a new project using a moderator page. It is noted that the moderator page will be associated with a UI, at least in part, similar to the UI 300 explained with reference to FIGS. 3 to 6. In at least one embodiment, the moderator page enables the creator of the project page (i.e. the moderator) to perform the following operations:

The moderator may tag a subject matter as a project or a problem or a class (as in classroom)

The moderator may tag the subject matter (using tags, such as the tags Biology, Cancer, Medicine etc. explained with reference to FIG. 1B)

The moderator may name as many moderators other than himself and assign other moderators only certain abilities or all abilities. Some non-limiting examples of such abilities include: the ability to edit a project or a problem, the ability to delete posts, the ability to comment on other people's posts, the ability to host chats and moderate chats, the ability to invite people to the forum, the ability to delete people from the forum, and the ability to type into the moderator window, and to create/edit notes at the top of the posts, the ability to make a project or problem 'OPEN' (implying anybody can join the project), 'PRIVATE' (implying only the moderator can invite people to the forum), 'APPLY' (implying people can apply to take part and the moderator can add or reject the person at his/her discretion) or 'BUSINESS/COMMERCIAL USE' (implying a 'Closed' or 'Apply' problem/project that is associated with a chargeable fee).

The moderator may enable any member to edit a project/problem or retain the ability to edit the project/problem himself/herself.

The moderator may view a log of when a participant logged into their project, and what they've done (have they edited the project, posted, or chatted etc.)

The moderator may add different tools to the project window depending on the project. For example, the moderator can add a calculator, a step by step math solver, a molecular drawing board, an art studio (for instance, the art studio would be a blank room that the moderator created. When the user hits this button, that blank room comes up and the artist can draw in it or paste JPEGs etc.)

The moderator may charge for his project/problem. Further, the moderator may make users pay to be members, may make it free, or if the moderator holds a class, then the moderator may have users view the project, but pay to view the live chat (where the class would be held).

The moderator may create a note at the top of all the posts that people can read before posting etc.

The moderator may enter words into a moderator window below the project window.

The moderator may create chats at anytime. The chats can be public, by invitation only, or people can request to join (the users may request to join in real time or in prior to the initiation of the chat interaction). In some embodiments, an option may be provided to the moderator to add a button for people to request a chat if it's closed or to make request for a chat by payment. Moderator may also make the chat 'text only', 'moderator video only' (where users are only allowed to type), video for moderator and all users, or, video for moderator and user of the moderator's choice, or text for the moderator and video for the users (all users or the users of the moderator's choice).

The moderator may type text below chat window or call up a live white board that the moderator(s) can write on in real time.

The moderator may talk in one window and show his/her desktop on another window next to it, show a live Webcam next to his personal Webcam etc.

FIG. 7 is a flow diagram of an example method 700 for facilitating user collaboration, in accordance with an example embodiment. The method 700 depicted in the flow diagram may be executed by, for example, the system 102 explained with reference to FIG. 2. Operations of the flowchart, and combinations of operation in the flowchart, may be implemented by, for example, hardware, firmware, a processor, circuitry and/or a different device associated with the execution of software that includes one or more computer program instructions. The operations of the method 700 are described herein with help of the system 102. It is noted that the operations of the method 700 can be described and/or practiced by using a system other than the system 200. The method 700 starts at operation 702.

At operation 702, the method 700 includes provisioning access to a collaboration application for a plurality of users by a processor such as a processor 108 of the system 102. The provisioning of the collaboration application, such as the collaboration application 112 may be performed as explained with reference to FIGS. 1A and 1B and is not explained again herein. The collaboration application includes a plurality of user interfaces (UIs) configured to facilitate collaboration among users. The various UIs of the collaboration application are depicted in FIGS. 1B to 6.

At operation 704, the method 700 includes receiving a post related to a problem to be solved or a project to be completed from a user from among the plurality of users by the processor. As explained above, a post related to a problem to be solved (for example, Goldbach's conjecture) or a project to be completed (for example, an art project, etc.) may be received from the user. The user may provide the post using the collaboration application.

At operation 706, the method 700 includes effecting display of the post on at least one UI of the collaboration application, by the processor, for facilitating viewing of the post by remaining users from among the plurality of users. For example, the post may be displayed on the home page of the collaboration application, as depicted in FIG. 1B, to facilitate viewing of the post by other users of the collaboration application 112.

At operation 708, the method 700 includes facilitating creation of a user group for collaborating on the problem to be solved or the project to be completed subsequent to receiving replies from one or more users indicating interest in collaborating with the user in response to the displayed post. As explained above, the creator of the post may invite other users to collaborate on the project and thereby create a virtual group for collaborating on solving the problem or completing the project. It is noted that the user group may include any number of members from as less as two members (for example, two peers collaborating on a project) to several hundred members for collaborating on a problem to be solved or a project to be completed.

At operation 710, the method 700 includes provisioning one or more relevant tools and interaction options, by the processor, to the user group to facilitate user collaboration. The provisioning of the relevant tools and interaction options may be performed as explained with reference to FIGS. 3, 4 and 5 and are not explained again herein.

At operation 712, the method 700 includes facilitating, by the processor, moderation of the user group to enable completion of the project or selection of a solution to the problem being solved. The moderation of the group may be performed as explained with reference to FIGS. 1B to 6 and is not explained again herein. The method 700 stops at operation 712.

The disclosed method 700 or one or more operations of the method 700 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Referring now to FIG. 8, a schematic block diagram of an electronic device 800 is shown that is capable of implementing embodiments of techniques for facilitating user collaboration as described herein. It is noted that the electronic device 800 as illustrated and hereinafter described is merely illustrative of one type of device and should not be taken to limit the scope of the embodiments. As such, it should be appreciated that at least some of the components described below in connection with the electronic device 800 may be optional and thus in an example embodiment may include more, less or different components than those described in connection with the example embodiment of FIG. 8. As such, among other examples, the electronic device 800 could be any of device from among fixed electronic devices, such as desktop computers and electronic kiosks, to mobile electronic devices, such as for example, personal digital assistants (PDAs), mobile televisions, cellular phones, tablet computers, laptops, mobile computers or any combination of the aforementioned, and other types of communication or multimedia devices.

The illustrated electronic device 800 includes a controller or a processor 802 (e.g., a signal processor, microprocessor, ASIC, or other control and processing logic circuitry) for performing tasks such as signal coding, data processing, image processing, input/output processing, power control, and/or other functions. An operating system 804 controls the allocation and usage of the components of the electronic device 800 and support for one or more applications programs (see, applications 806), such as a collaboration application, that implements one or more of the innovative features described herein. In addition to collaboration application, the applications 806 may include common mobile computing applications (e.g., telephony applications, email applications, calendars, contact managers, web browsers, messaging applications) or any other computing application. The collaboration application may include UIs such as the UIs explained with reference to FIGS. 1B to 6 and may be similar to the collaboration application 112 explained with reference to FIGS. 1A to 6.

The illustrated electronic device 800 includes one or more memory components, for example, a non-removable memory 808 and/or removable memory 810. The non-removable memory 808 can include RAM, ROM, flash memory, a hard disk, or other well-known memory storage technologies. The removable memory 810 can include flash memory, smart cards, or a Subscriber Identity Module (SIM). The one or more memory components can be used for storing data and/or code for running the operating system 804 and the applications 806. Examples of data can include web pages, text, images, sound files, image data, video data, or other data sets to be sent to and/or received from one or more network servers or other devices via one or more wired or wireless networks. The electronic device 800 may further include a user identity module (UIM) 812. The UIM 812 may be a memory device having a processor built in. The UIM 812 may include, for example, a SIM, a universal integrated circuit card (UICC), a universal subscriber identity module (USIM), a removable user identity module (R-UIM), or any other smart card. The UIM 812 typically stores information elements related to a mobile subscriber. The UIM 812 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA).

The electronic device 800 can support one or more input devices 820 and one or more output devices 830. Examples of the input devices 820 may include, but are not limited to, a touch screen 822 (e.g., capable of capturing finger tap inputs, finger gesture inputs, multi-finger tap inputs, multi-finger gesture inputs, or keystroke inputs from a virtual keyboard or keypad), a microphone 824 (e.g., capable of capturing voice input), a camera module 826 (e.g., capable of capturing still picture images and/or video image frames) and a physical keyboard 828. Examples of the output devices 830 may include, but are not limited to a speaker 832 and a display 834. Other possible output devices (not shown) can include piezoelectric or other haptic output devices. Some devices can serve more than one input/output function. For example, the touch screen 822 and the display 834 can be combined into a single input/output device.

In an embodiment, the camera module 826 may include a digital camera capable of facilitating image/video capture. In some implementations, the camera module 826 may include two or more cameras, for example, a front camera and a rear camera positioned on two sides of the electronic device 800. As such, the camera module 826 includes all hardware, such as a lens or other optical component(s), and software for capturing images and/or creating a video stream from a captured video. Alternatively, the camera module 826 may include the hardware needed to view the video, while a memory device of the electronic device 800 stores instructions for execution by the processor 802 in the form of software to create a video stream from a captured video. In an example embodiment, the camera module 826 may further include a processing element such as a co-processor, which assists the processor 802 in processing image frame data and an encoder and/or decoder for compressing and/or decompressing image data. In an embodiment, the camera module 826 may provide live image data (viewfinder image data) to the display 834.

A wireless modem 840 can be coupled to one or more antennas (not shown in FIG. 8) and can support two-way communications between the processor 802 and external devices, as is well known in the art. For example, the communication may include provisioning notifications to the user and the like. The wireless modem 840 is shown generically and can include, for example, a cellular modem 842 for communicating at long range with the mobile communication network, a Wi-Fi-compatible modem 844 for communicating at short range with an external Bluetooth-equipped device or a local wireless data network or router, and/or a Bluetooth-compatible modem 846. The wireless modem 840 is typically configured for communication with one or more cellular networks, such as a GSM network for data and voice communications within a single cellular network, between cellular networks, or between the mobile device and a public switched telephone network (PSTN).

The electronic device 800 can further include one or more input/output ports 850, a power supply 852, one or more sensors 854, a transceiver 856 (for wirelessly transmitting analog or digital signals) and/or a physical connector 860, which can be a USB port, IEEE 1394 (FireWire) port, and/or RS-232 port. The illustrated components are not required or all-inclusive, as any of the components shown can be deleted and other components can be added.

Various example embodiments offer, among other benefits, techniques for user collaboration. More specifically, various embodiments disclosed herein provide a collaboration application that may be used by individual users, group users, enterprises, institutions etc. for group based problem solving or project completion. The collaboration application is developed for millions of users who are present at different location but may collaborate in order to complete a project or solve a problem. Moreover, the collaboration application allows for a large number of people to collaborate in an intuitive and simple way. Further, the collaboration application also enables sifting through all data by using a voting system and then allows a moderator to judge what to use of the most popular suggestions.

Additionally, the collaboration application enables users to collaborate more effectively by sharing content, such as documents, videos, power point etc., and interacting in real time via text or video chat. The chat feature as explained with reference to FIGS. 4 and 5 may also be used as a live classroom. An educational session from the teacher can be streamed live in the project window and the students can post below it. The teacher-student interaction may also be facilitated using the video chat feature. In some example scenarios, teachers may charge each student if he/she wants. The project window can also stream live video, which could overlook a project like a village in Africa where participants/other users can see the work the group has created in real time.

The collaboration application is also configured to support any of video editing, creation of art, creation of 3d and 2d images and video, films, television shows, music creation, concerts, seminars, classes, experiments, blueprint creation and editing, drug creation, food recipes, document creation of any kind, book writing, script writing, inventions, product creation and marketing, party planning, entire conventions, instruction creation and editing, alternative energy solutions and the like.

The collaboration application may also be used to facilitate collaboration among a number of users to create software. In an embodiment, a 'Run Window' may be displayed in project area along with a 'Coding Window'. The 'Run Window' may be configured to allow any user to run the software in that particular window. The moderator can then choose to allow all users to edit the code or the users can suggest code in the posts and the moderator can simply copy and paste their suggestions into the 'Coding window'. In at least some example embodiments, only the moderators are empowered to insert and edit the code.

In some embodiments, the collaboration application may facilitate creation of a community with members able to post articles, add friends to a friends list, add a biographical account, and share sample work or videos. Other users may be able to view the member's biographical account and work, user's location, how many up votes the member has, how many project/problems the member is a moderator on, how many projects/problems the member is participating in, whether the member is a moderate user, an advanced user, a new member, an accredited user or a highly skilled user etc. One such exemplary member page is explained with reference to FIG. 2. A user may be able to message a member or chat with him/her. The member may also be able to turn interaction requests ON or OFF.

The collaboration application as described herein may enable research centers all over the world to coordinate their efforts to solve vexing problems, such as for example, inventing a cure for any disease. The collaboration application may enable the research centers to post their findings that could provide information to others researchers working in similar field and save many precious years of hard work. They could also post experiments that didn't work thereby saving time for others.

Further, experiments may be conducted in other countries, such as for example, medicine and vaccinations could be tried in countries with fewer restrictions, while people in those countries could ask for money and resources to carry out said experiments. In addition, scientists and other researchers could get popular endorsements and donations using the collaboration application. Similarly, laboratories and test facilities could post live webcams and get suggestions from groups formed on the collaboration application, in real time. These experiments could be carried out in real time and also posted for millions to see. This would give people access to millions of dollars of equipment they would not otherwise have.

In some example scenarios, using the collaboration application, charities could ask for donations or even solutions to some problems they're encountering. Organizations may even recruit volunteers using the collaboration application. In some scenarios, using the collaboration application, garage scientists could get suggestions, money and even equipment sent to them. Furthermore, recommendations could be made for production facilities. The resulting product could then be requested in any state or country because they saw it or invested in it on collaboration application.

Furthermore, the collaboration application may allow different people and subjects to work together in a way that is intuitive to the project. For instance, math-based boards may contain different tools than a science-based or art-based board. A user will be able to arrange formulas, post videos, pictures, molecule structures, and links, while people watch in real time. There will also be ability to code with people in real time so entire software programs can be created on the site. Companies, such as computing companies, engineering companies and even product-based companies for example, may choose to sponsor different boards depending on the subject matter.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the system 102, the database 104, the collaboration platform 106, the processor 108 and the memory 110 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations (for example, operations explained herein with reference to FIG. 7). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Referring now to FIG. 9 an alternative embodiment 901 of the UI of the collaboration application while a new project 903 is created by user. It is contemplated and will be appreciated that the project will require information about the project before it can be created. Types of information contemplated include a project description 905, accessibility restrictions, user contribution controls 907, permission to add additional users 909, options to include features 911 such as chat, forums, widgets, 3$^{rd}$ party applications and the like, control over the financial restrictions 913 of the project.

It is further contemplated that projects will have contributing users that speak different languages from each other and that any part of the UI could have automatic language translation 915. It will be appreciated that language is presented both textually and verbally.

An example of features 911 that could be included in a project are widgets 917 or applications that enable productivity such as 3D modeling, word processing, calculation sheets, programing editors and the like. It is contemplated that these features 911 could be enabled or added when the project is created or at while the project is active.

An example of another feature 911 is an artificial intelligence engine 919 that acts as an assistant or collaborator on the project. It will be appreciated that is AI engine 919 could interact with the users visually or through text.

It will be appreciated that the monetary control or financial restrictions 913 of the project could include the ability to hire users to contribute to the project. Likewise, the users have the ability to pay to access the project. These examples are given as illustrative only and other forms of financial engagement such as stock, donations, public access and the like are also contemplated.

While a project is active it is contemplated that various forms of the UI allow the collaborating users to contribute to the project. It is contemplated that a user could allow another user to view the UI from their prospective. As depicted by FIG. 10 it is contemplated that UI could be projected in virtual space via a virtual reality workspace 1001. Within the workspace 1001 information is presented in panels or areas, depicted as a forum panel 1003, a voting panel 1005 and a project status panel 1007. These panels are given as examples and are not intended to limit the scope of information available in the workspace 1001. It is contemplated that the workspace could appear as a room, workshop, warehouse, forest or any other location. In the current embodiment workspace 1001 includes a contribution stage 1009 where the project is altered or constructed virtually.

It will be appreciated that the users 1001 area able to work in the same virtual space simultaneously or individually as the project or time permits. It is also contemplated that a user is able to save a snapshot of the project to be communicated with users both in and out of the project group via such media as text documents, video, and the like.

It will be appreciated that a project page 1101 in accordance with the collaboration application as described. The project page 1101 including a visual representation of the project 1103, a list of participating users 1107, a comment or chat log 1105 and a news feed 1109 of communication between the users not related to the project.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed:
1. A computer-implemented method for facilitating user collaboration, the method comprising:
provisioning, by a processor, access to a collaboration application for a plurality of users, the collaboration application comprising a plurality of user interfaces (UIs) configured to facilitate collaboration among users;
receiving, by the processor, a post related to a problem to be solved or a project to be completed from a user from among the plurality of users, the post provisioned by the user using the collaboration application;
effecting, by the processor, display of the post on at least one UI of the collaboration application for facilitating viewing of the post by remaining users from among the plurality of users;
facilitating, by the processor, creation of a user group for collaborating on the problem to be solved or the project to be completed subsequent to receiving replies from one or more users indicating interest in collaborating with the user in response to the displayed post;
provisioning, by the processor, one or more relevant tools and interaction options to the user group to facilitate user collaboration; and
facilitating, by the processor, moderation of the user group to enable completion of the project or selection of a solution to the problem being solved;
building, by the processor, using the collaboration tool, a three-dimensional model that is editable by the plurality of users in the user group in real-time during the user collaboration; and
hiring, by the processor, at least one of the plurality of users to contribute to the three dimensional model and project during the project;
making a payment, by the processor, to the at least one of the users that is hired for the project;
imparting, via the processor, financial restrictions that are changeable by a moderator during the collaboration in real time.

2. The method as claimed in claim 1, wherein the collaboration application is configured as at least one of a Web-based application and a native mobile device application.

3. The method as claimed in claim 1, wherein the problem to be solved corresponds to one of inventing a cure for a disease, determining a solution to an unsolved mathematical problem, drafting a constitution for a country, identifying ways to combat climate change, improving a quality of air in metropolitan cities, identifying ways to provide potable water for drought-affected areas and creating energy-efficient sustainable designs for cities.

4. The method as claimed in claim 1, wherein the project to be completed corresponds to one of completing an art project, creating software, organizing a theatrical performance, compiling census data, completing a statistical survey, and managing an event.

5. The method as claimed in claim 1, further comprising:
enabling the user, by the processor, to invite individuals from among field experts, research scientists, academicians, users from relevant organizations and general public to collaborate on the problem to be solved or the project to be completed.

6. The method as claimed in claim 1, wherein the one or more relevant tools comprise at least one of an online whiteboard, a drawing tool, a calculator, a step-by-step math solver, a programming workspace, a live editable document feature, a drag and drop audio/video files feature, a clipboard feature and a note-making feature.

7. The method as claimed in claim 1, wherein the interaction options comprise at least one of a live video chat feature, a text chat feature and an instant messaging feature.

8. The method as claimed in claim 1, wherein the user creating the post is assigned as a moderator of the user group.

9. The method as claimed in claim 8, further comprising:
enabling the user, by the processor, to choose one or more members of the user group as additional moderators for the user group.

10. The method as claimed in claim 9, further comprising:
facilitating, by the processor, creation of a user interface (UI) corresponding to the problem to be solved or the project to be completed, the UI configured to provide a shared workspace to the user group for collaborating on solving the project or completing the project.

11. The method as claimed in claim 10, further comprising:
enabling each member of the user group to post respective ideas for solving the project or completing the project on the UI, wherein each idea is capable of being up-voted or down-voted by other members in the user group.

12. The method as claimed in claim 10, wherein the UI comprises a coding window and a testing window configured to enable the user group to collaborate on creating software, wherein the coding window is configured to receive a plurality of lines of code from one or more members of the user group, and wherein the testing window is configured to facilitate testing of the plurality of lines of code.

13. The method as claimed in claim 10, wherein the UI is configured to facilitate sharing of one or more content files related to the problem to be solved or the project to be completed, the one or more content files uploaded by the moderator of the user group.

14. The method as claimed in claim 10, wherein the shared workspace is configured to facilitate at least one of live creation of two-dimensional or three-dimensional content, real-time scribbling or drawing of notes, live creation of software content, live creation of musical or art content and live editing of at least one of documents and video content.

15. The method as claimed in claim 1, wherein the collaboration application is configured to facilitate collaboration between a teacher of a subject matter and one or more students interested in learning the subject matter.

16. The method as claimed in claim 1, wherein the post related to the problem to be solved or the project to be completed includes a request for donation from remaining users of the plurality of users capable of accessing the collaboration application.

17. A system for facilitating user collaboration, the system comprising:
a database; and
a collaboration platform communicably coupled with the database, the collaboration platform comprising:
at least one processor, and
a memory having stored therein machine executable instructions, that when executed by the at least one processor, cause the system to:
provision access to a collaboration application for a plurality of users, the collaboration application comprising a plurality of user interfaces (UIs) configured to facilitate collaboration among users;
receive a post related to a problem to be solved or a project to be completed from a user from among the plurality of users, the post provisioned by the user using the collaboration application;
effect display of the post on at least one UI of the collaboration application for facilitating viewing of the post by remaining users from among the plurality of users;
facilitate creation of a user group for collaborating on the problem to be solved or the project to be completed subsequent to receiving replies from one or more users indicating interest in collaborating with the user in response to the displayed post;
provision one or more relevant tools and interaction options to the user group to facilitate user collaboration; and
building, by the processor, using the collaboration tool, a three-dimensional model that is editable by the plurality of users in the user group in real-time during the user collaboration; and
facilitate moderation of the user group to enable completion of the project or selection of a solution to the problem being solved;
hire, by the processor, at least one of the plurality of users to contribute to the three-dimensional model and project during the project;
make a payment, by the processor, to the at least one of the users that is hired for the project;
imparting, via the processor, financial restrictions that are changeable by a moderator during the collaboration in real time.

18. The system as claimed in claim 17, wherein the system is further caused to:
enable the user to invite individuals from among field experts, research scientists, academicians, users from relevant organizations and general public to collaborate on the problem to be solved or the project to be completed.

19. The system as claimed in claim 17, wherein the one or more relevant tools comprise at least one of an online whiteboard, a drawing tool, a calculator, a step-by-step math solver, a programming workspace, a live editable document feature, a drag and drop audio/video files feature, a clipboard feature and a note-making feature.

20. The system as claimed in claim 17, wherein the interaction options comprise at least one of a live video chat feature, a text chat feature and an instant messaging feature.

21. The system as claimed in claim 17, wherein the user creating the post is assigned as a moderator of the user group, and wherein the system is further caused to enable the user to choose one or more members of the user group as additional moderators for the user group.

22. The system as claimed in claim 21, wherein the system is further caused to: facilitate creation of a user interface (UI) corresponding to the problem to be solved or the project to be completed, the UI configured to provide a shared workspace to the user group for collaborating on solving the project or completing the project, wherein the UI is configured to facilitate sharing of one or more content files related to the problem to be solved or the project to be completed, the one or more content files uploaded by the moderator of the user group.

23. The system as claimed in claim 22, wherein the system is further caused to: enable each member in the user group to post respective ideas for solving the project or completing the project on the UI, wherein each idea is capable of being up-voted or down-voted by other members in the user group.

24. The system as claimed in claim 22, wherein the UI comprises a coding window and a testing window configured to enable the user group to collaborate on creating software, the coding window configured to receive a plurality of lines of code from one or more members of the user group, and wherein the testing window is configured to facilitate testing of the plurality of lines of code.

25. The system as claimed in claim 22, wherein the shared workspace is configured to facilitate at least one of live creation of two-dimensional or three-dimensional content, real-time scribbling or drawing of notes, live creation of software content, live creation of musical or art content and live editing of at least one of documents and video content.

26. A computer program product comprising at least one computer-readable storage medium, the computer-readable storage medium comprising a set of instructions, which, when executed by one or more processors, cause an electronic device to at least perform:
  effect display of at least one user interface (UI) from among a plurality of user interfaces (UIs) configuring a collaboration application, the collaboration application configured to facilitate collaboration among users;
  receive input corresponding to a post related to a problem to be solved or a project to be completed from a user associated with the electronic device, the post provisioned by the user using the collaboration application, wherein the post is displayed on one or more UIs of the collaboration application for facilitating viewing of the post by remaining users from among a plurality of users of the collaboration application; and
  facilitate creation of a user group for collaborating on the problem to be solved or the project to be completed subsequent to receiving replies from one or more users indicating interest in collaborating with the user in response to the displayed post, wherein the collaboration application is configured to provision one or more relevant tools and interaction options to the user group to facilitate user collaboration, and wherein the collaboration application is configured to facilitate moderation of the user group to enable completion of the project or selection of a solution to the problem being solved;
  build, by the processor, using the collaboration tool, a three-dimensional model that is editable by the plurality of users in the user group in real-time during the user collaboration; and
  hire, by the processor, at least one of the plurality of users to contribute to three-dimensional model and the project during the project;
  make a payment, by the processor, to the at least one of the users that is hired for the project;
  impart, via the processor, financial restrictions that are changeable by a moderator during the collaboration in real time.

27. The computer program product as claimed in claim 26, wherein the one or more relevant tools comprise at least one of an online whiteboard, a drawing tool, a calculator, a step-by-step math solver, a programming workspace, a live editable document feature, a drag and drop audio/video files feature, a clipboard feature and a note-making feature, and wherein the interaction options comprise at least one of a live video chat feature, a text chat feature and an instant messaging feature.

28. The computer program product as claimed in claim 26, wherein the electronic device is further caused to:
  effect display of a UI corresponding to the problem to be solved or the project to be completed, the UI configured to provide a shared workspace to the user group for collaborating on solving the project or completing the project.

29. The computer program product as claimed in claim 28, wherein the UI enables each member of the user group to post respective ideas for solving the project or completing the project, and wherein each idea is capable of being up-voted or down-voted by other members in the user group.

30. The computer program product as claimed in claim 28, wherein the UI comprises a coding window and a testing window configured to enable the user group to collaborate on creating software, the coding window configured to receive a plurality of lines of code from one or more members of the user group, and wherein the testing window is configured to facilitate testing of the plurality of lines of code.

31. The computer program product as claimed in claim 28, wherein the UI is configured to facilitate sharing of one or more content files related to the problem to be solved or the project to be completed, the one or more content files uploaded by a moderator of the user group.

32. The computer program product as claimed in claim 28, wherein the shared workspace is configured to facilitate at least one of live creation of two-dimensional or three-dimensional content, real-time scribbling or drawing of notes, live creation of software content, live creation of musical or art content and live editing of at least one of documents and video content.

33. A computer-implemented method for facilitating user collaboration comprising a virtual reality workspace for a project given the method of claim 1, 17 or 26 wherein a user is submersed within a computer generated environment while contributing to the progress of a project.

34. The method as claimed in claim 33, further comprising:
  enabling the user, by the processor, to create a new project and by selecting and defining features of the project.

35. The method as claimed in claim 34 wherein the features comprise: a project description;

accessibility restrictions; user contribution controls; permission to add additional users; the option to include widgets; and financial restrictions.

36. A project method as claimed in claim 33 wherein an artificial intelligence engine contributes to the users directly or the project.

37. A project method as claimed in claim 33 wherein the users capture snapshots of the project to communicate the status of the project with other users or themselves.

* * * * *